United States Patent [19]
Kikuchi

[11] Patent Number: 5,381,767
[45] Date of Patent: Jan. 17, 1995

[54] ELECTRONIC CONTROL SYSTEM FOR AN INTERNAL COMBUSTION ENGINE

[75] Inventor: Toshiaki Kikuchi, Okazaki, Japan

[73] Assignee: Nippondenso Co., Ltd., Kariya, Japan

[21] Appl. No.: 47,443

[22] Filed: Apr. 16, 1993

[30] Foreign Application Priority Data

Apr. 17, 1992 [JP] Japan .................................. 4-097581
Mar. 8, 1993 [JP] Japan .................................. 5-046778

[51] Int. Cl.$^6$ .............................................. F02M 3/00
[52] U.S. Cl. ................................................... 123/339
[58] Field of Search ............... 123/339, 1 A, 494, 613, 123/478; 73/61.43

[56] References Cited

U.S. PATENT DOCUMENTS

| | | | |
|---|---|---|---|
| 4,438,749 | 3/1984 | Schwippert | 123/494 |
| 4,706,629 | 11/1987 | Wineland et al. | 123/478 |
| 4,706,630 | 11/1987 | Wineland et al. | 123/1 A |
| 4,770,129 | 9/1988 | Miyata et al. | 123/1 A |
| 4,905,655 | 3/1990 | Maekawa | 123/494 |
| 4,942,848 | 7/1990 | Terasaka | 123/1 A |
| 4,962,746 | 10/1990 | Miyata et al. | 123/613 |
| 4,974,552 | 12/1990 | Sickafus | 123/1 A |
| 4,982,709 | 1/1991 | Oota | 123/339 |
| 5,261,270 | 11/1993 | Gonze et al. | 73/61.43 |

FOREIGN PATENT DOCUMENTS

| | | | |
|---|---|---|---|
| 62-288335 | 12/1987 | Japan | 123/1 A |
| 63-272935 | 11/1988 | Japan | 123/1 A |
| 3117650 | 5/1991 | Japan | 123/1 A |
| 357292 | 8/1991 | Japan | 123/1 A |

*Primary Examiner*—Raymond A. Nelli
*Attorney, Agent, or Firm*—Cushman, Darby & Cushman

[57] ABSTRACT

An electronic control system for an internal combustion engine. The system detects a property of the gasoline such as a vaporization characteristic by using refractive indexes. The system then detects various operating conditions of the engine. The system also determines various control amounts of the engine in accordance with the detected gasoline property and the various engine operating conditions. The system may determine a rate of fuel injection into the engine in accordance with the detected gasoline property. The system also controls the engine in accordance with the various control amount. Finally, the system detects that the engine is in an improper controlled state and may suppress one or more of the controls.

19 Claims, 21 Drawing Sheets

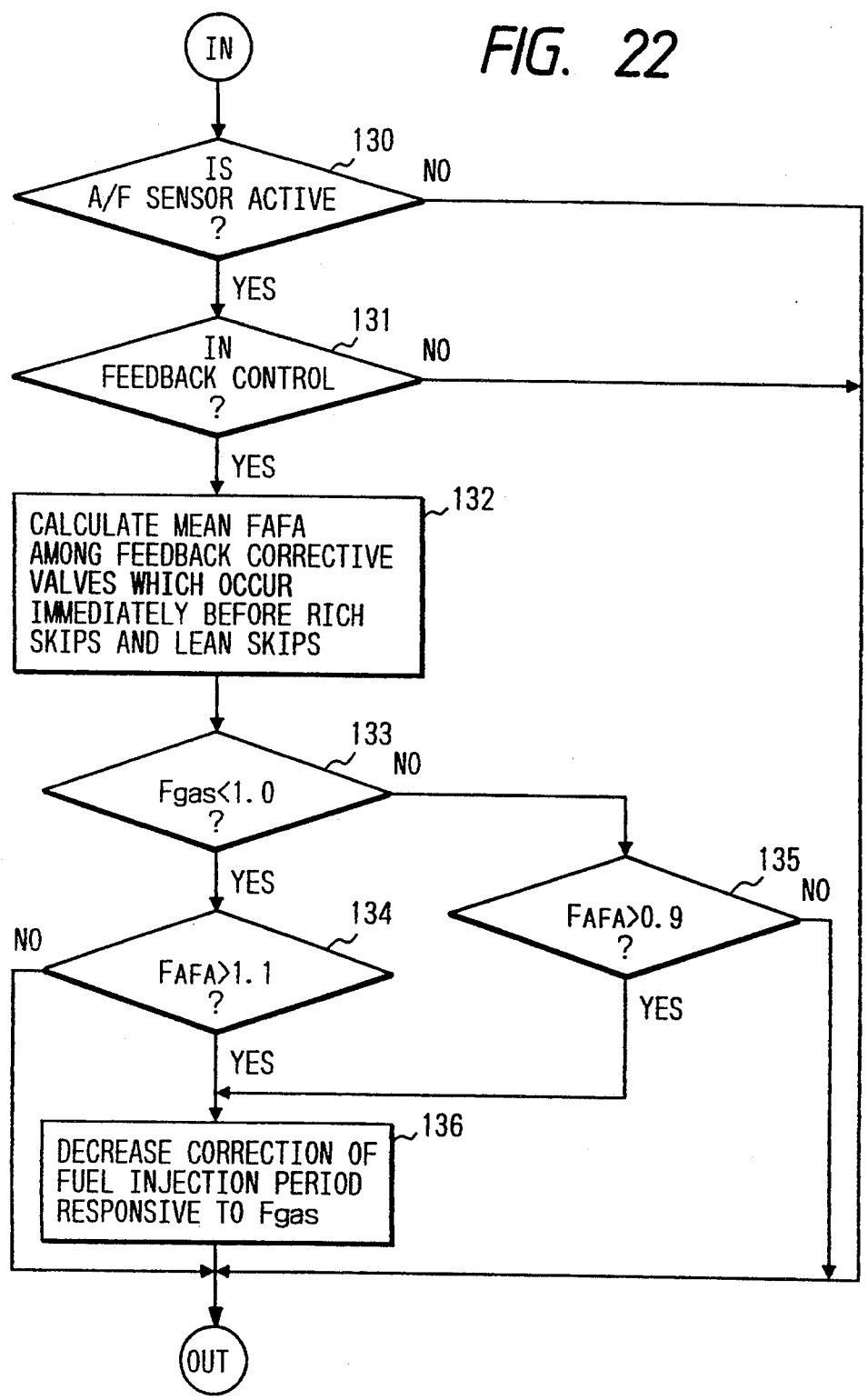
FIG. 22
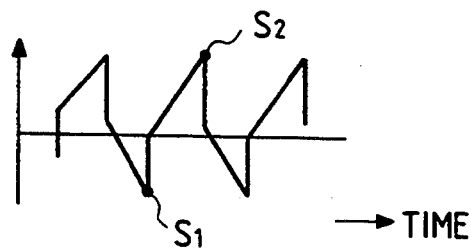
FIG. 23 FEEDBACK CORRECTIVE VALUE

ELECTRONIC CONTROL SYSTEM FOR AN INTERNAL COMBUSTION ENGINE

BACKGROUND OF THE INVENTION

1. Field of the Invention

This invention relates to an electronic control system for an internal combustion engine. Specifically, this invention relates to an electronic system for adjusting a controlled quantity of an internal combustion engine such as a fuel injection rate or a spark timing in response to a property of fuel, for example, the degree of goodness or poorness of vaporization characteristics of fuel.

2. Description of the Prior Art

Since the degree of goodness or poorness of vaporization characteristics of fuel significantly affects the atomization thereof, the air-to-fuel ratio (A/F ratio) of an air-fuel mixture in an internal combustion engine is closely related to the degree of goodness or poorness of vaporization characteristics of fuel. It has been conceived that the degree of goodness or poorness of vaporization characteristics of fuel is detected and the A/F ratio of an air-fuel mixture is corrected in response to the detected degree.

Japanese published unexamined patent application 3-117650 discloses that heavy gasoline is greater in refractive index than regular gasoline, and a gasoline quality sensor detects the refractive index of used gasoline to determine whether or not the used fuel is of a heavy type. Japanese patent application 3-117650 teaches an apparatus for controlling the start of an engine in response to the output signal of the gasoline quality sensor.

Adding alcohol or other material to gasoline changes the refractive index thereof while conditions of atomization thereof are essentially unchanged. Thus, the accuracy of the gasoline quality sensor in Japanese patent application 3-117650 tends to be lowered when alcohol or other material is added to gasoline. In addition, the reliability of an engine control system using such a gasoline quality sensor tends to be decreased when alcohol or other material is added to gasoline.

SUMMARY OF THE INVENTION

It is an object of this invention to provide an improved electronic control system for an internal combustion engine.

A first aspect of this invention provides an electronic control system for an internal combustion engine which is fed with gasoline from a fuel supply source, the system comprising gasoline-property detecting means for detecting a property of the gasoline; operating-condition detecting means for detecting an operating condition of the engine; control-amount determining means for determining a control amount of the engine in accordance with the gasoline property detected by the gasoline-property detecting means and the engine operating condition detected by the operating-condition detecting means; control means for controlling the engine in accordance with the control amount determined by the control-amount determining means; and wrong-operation preventing means for detecting an improper controlled state of the engine, and for suppressing gasoline-property-responsive control via the control-amount determining means when the improper controlled state of the engine is detected.

A second aspect of this invention provides an apparatus for controlling an engine including means for mixing air and fuel into an air-fuel mixture, and means for burning the air-fuel mixture, the apparatus comprising means for detecting a property of the fuel; means for controlling an operating condition of the engine in accordance with the property of the fuel which is detected by the detecting means; means for determining whether or not said controlling of the operating condition of the engine by the controlling means is wrong; and means for suppressing said controlling of the operating condition of the engine by the controlling means when the determining means determines said controlling to be wrong.

A third aspect of this invention provides an apparatus for controlling an engine including means for mixing air and fuel into an air-fuel mixture, and means for burning the air-fuel mixture, the apparatus comprising means for detecting a degree of poorness of vaporization characteristics of the fuel; means for controlling an operating condition of the engine in accordance with the degree of poorness of vaporization characteristics of the fuel which is detected by the detecting means; means for determining whether or not said controlling of the operating condition of the engine by the controlling means is wrong; and means for suppressing said controlling of the operating condition of the engine by the controlling means when the determining means determines said controlling to be wrong.

BRIEF DESCRIPTION OF THE DRAWINGS

FIG. 22 is a flowchart of a wrong-operation preventing block in a fifth embodiment of this invention.

FIG. 23 is a time-domain diagram of an A/F ratio correction value.

DESCRIPTION OF THE FIRST PREFERRED EMBODIMENT

Figure 1:
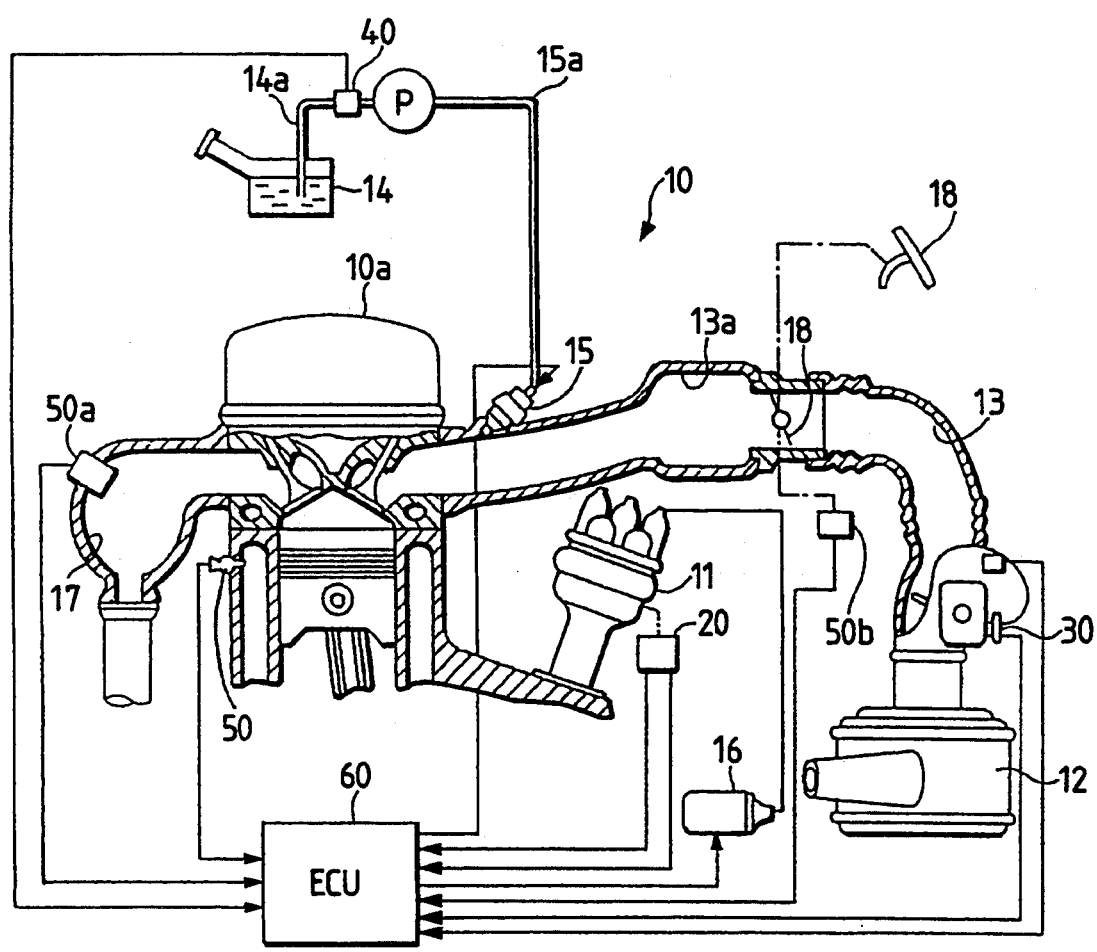
FIG. 1 is a diagram of an electronic control system according to a first embodiment of this invention.

With reference to FIG. 1, an electronic control system for an automotive internal combustion engine 10 includes an engine rotation sensor or a crank angle sensor 20, an air flow rate sensor 30, a gasoline property sensor or a gasoline quality sensor 40, a coolant temperature sensor 50, and an electronic control unit 60. The electronic control unit 60 will be shortened to "ECU" hereinafter. The sensors, 20, 30, 40, and 50 are electrically connected to the ECU 60.

The engine rotation sensor 20 is disposed within a distributor 11 of the engine 10, and is associated with an engine camshaft. The engine rotation sensor 20 detects rotation of the engine camshaft, generating and outputting a cylinder detection signal per two rotations of the crankshaft of the engine 10 (one rotation of the engine camshaft) when the engine crank angle reaches a point corresponding to the top dead center of a specified engine cylinder. In addition, the engine rotation sensor 20 generates and outputs a rotation angle signal at given crank angles spaced by equal angular intervals of, for example, 30 degrees.

The air flow rate sensor 30 includes an air flow meter which detects the rate of flow of air in an air intake passage 13 extending between an air cleaner 12 and the engine cylinders. The air flow rate sensor 30 generates and outputs a signal representing the detected air flow rate.

The gasoline property sensor 40 is disposed in a fuel passage 14a extending between a fuel tank 14 and a fuel pump P of the engine 10. The gasoline property sensor 40 detects the degree of goodness or poorness of vaporization characteristics of gasoline drawn from the fuel tank 14 into the fuel pump P. The fuel pump P is activated by an electric current fed from a battery B via an engine ignition switch IG (not shown in FIG. 1). The gasoline property sensor 14 generates and outputs a signal representing the detected degree of goodness or poorness of vaporization characteristics of gasoline.

Figure 4:
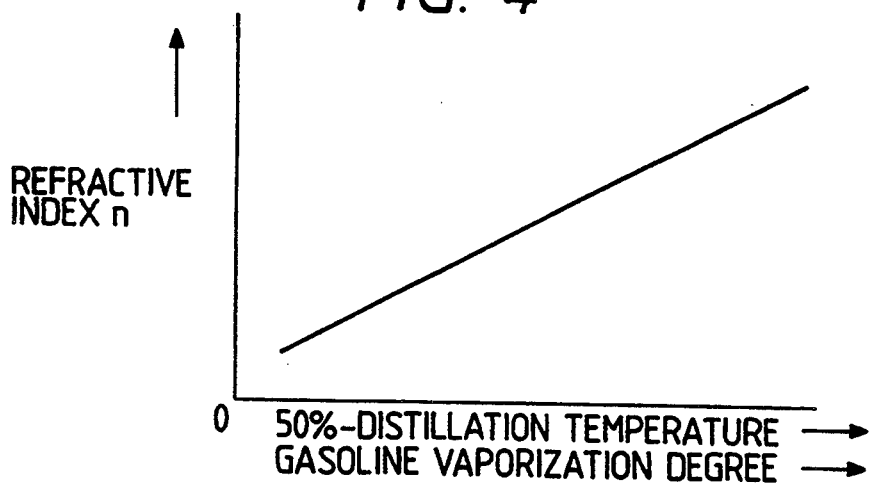
FIG. 4 is a graph of the relation among a refractive index "n", a 50%-distillation temperature T50, and a degree of poorness of vaporization characteristics of gasoline.

In general, there are various properties of gasoline which affect the drivability of the automotive vehicle when the engine 10 is cold. One of these properties of gasoline is a 50%-distillation temperature T50 at which 50% of gasoline is distilled or vaporized. According to experiments on various types of gasoline, it has been found that the 50%-distillation temperature T50 of gasoline is approximately proportional to the specific gravity of gasoline and the degree of poorness of vaporization characteristics of gasoline, and that the specific gravity of gasoline is essentially proportional to the refractive index "n" of gasoline. Thus, as shown in FIG. 4, there is an approximately proportional relation among the 50%-distillation temperature, the degree of poorness of vaporization characteristics, and the refractive index of gasoline. In view of these facts, a sensor for detecting the refractive index of gasoline is used as the gasoline property sensor 40.

The coolant temperature sensor 50 is disposed in a cooling system of the body 10a of the engine 10, detecting the temperature of engine coolant and outputting a signal representative of the detected engine coolant temperature.

An A/F ratio sensor 50a located in an engine exhaust passage 17 includes an O$_2$ sensor which detects the oxygen concentration in exhaust gas in the exhaust passage 17 to estimate the A/F ratio of an air-fuel mixture drawn into the engine 50. The A/F ratio sensor 50a generates and outputs a signal representing whether an air-fuel mixture drawn into the engine 50 is richer or leaner than the stoichiometric reference mixture. The A/F ratio sensor 50a is electrically connected to the ECU 60. Thus, the A/F ratio sensor 50a informs the ECU 60 of the estimated A/F ratio of the air-fuel mixture.

A throttle sensor 50b connected to an engine throttle valve 18 includes an idle switch and an open-degree sensor. The idle switch is closed only when the throttle valve 18 assumes a fully-closed position. The open-degree sensor detects the degree of opening through the throttle valve 18, generating and outputting a signal representative of the detected degree of opening through the throttle valve 18. The throttle valve 18 is linked to a vehicle accelerator pedal 18a so that the degree of opening through the throttle valve 18 can be varied in accordance with the degree of depression of the accelerator pedal 18a. The throttle sensor 50b is electrically connected to the ECU 60. Specifically, the throttle sensor 50b informs the ECU 60 of whether or not the throttle valve 18 is fully closed.

Figure 2:
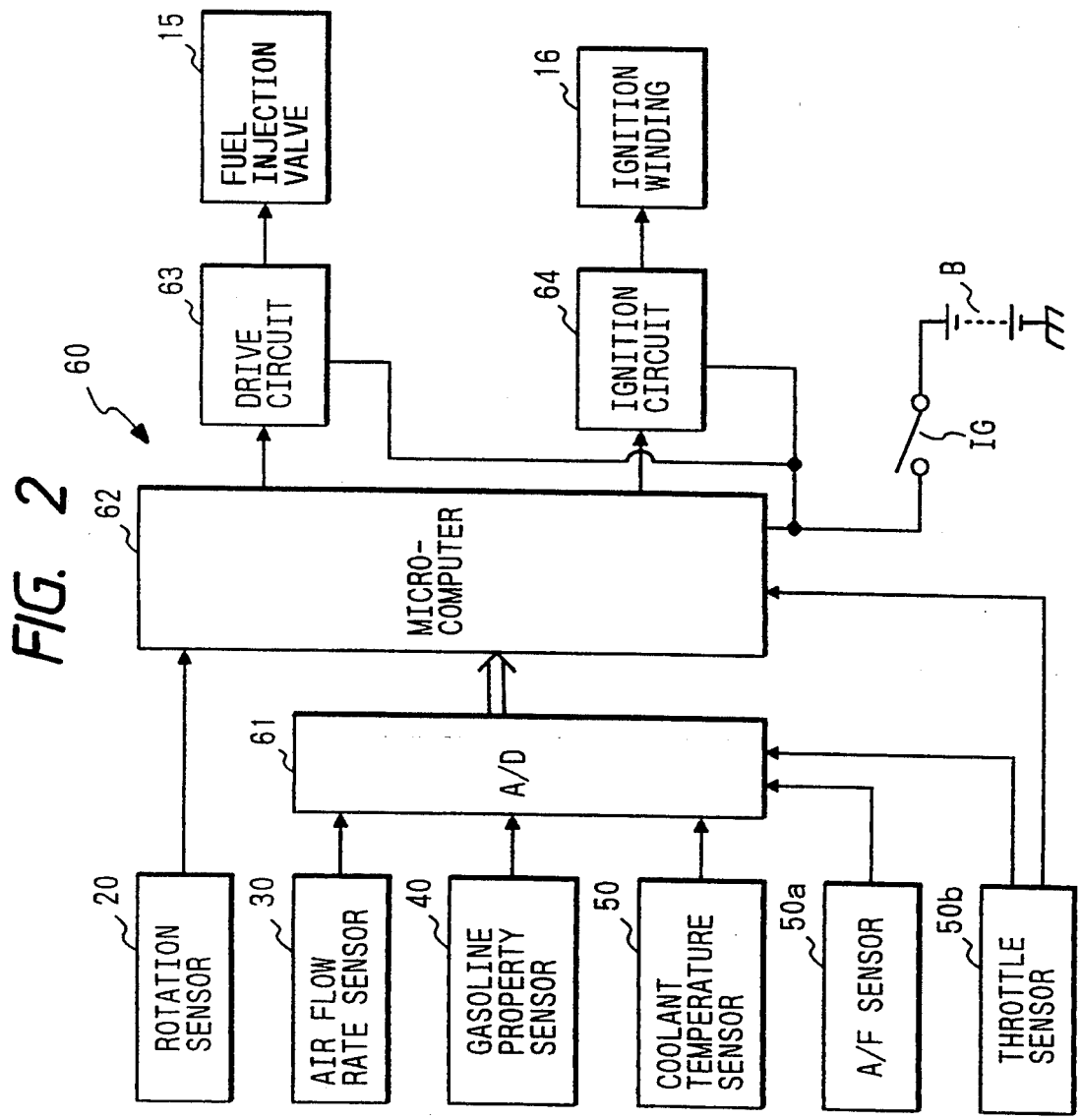
FIG. 2 is a block diagram of the electronic control system in the first embodiment.

As shown in FIG. 2, the ECU 60 includes a combination of an analog-to-digital (A/D) converter 61 and a microcomputer 62. The A/D converter 61 receives the output signals of the air flow rate sensor 30, the gasoline property sensor 40, the coolant temperature sensor 50, the A/F ratio sensor 50a, and the throttle sensor 50b, and converts the received signals into corresponding digital signals fed to the microcomputer 62. The output signal of the engine rotation sensor 20 is directly fed to the microcomputer 62. In addition, one of the output signals of the throttle sensor 50b is directly fed to the microcomputer 62.

Figure 3:
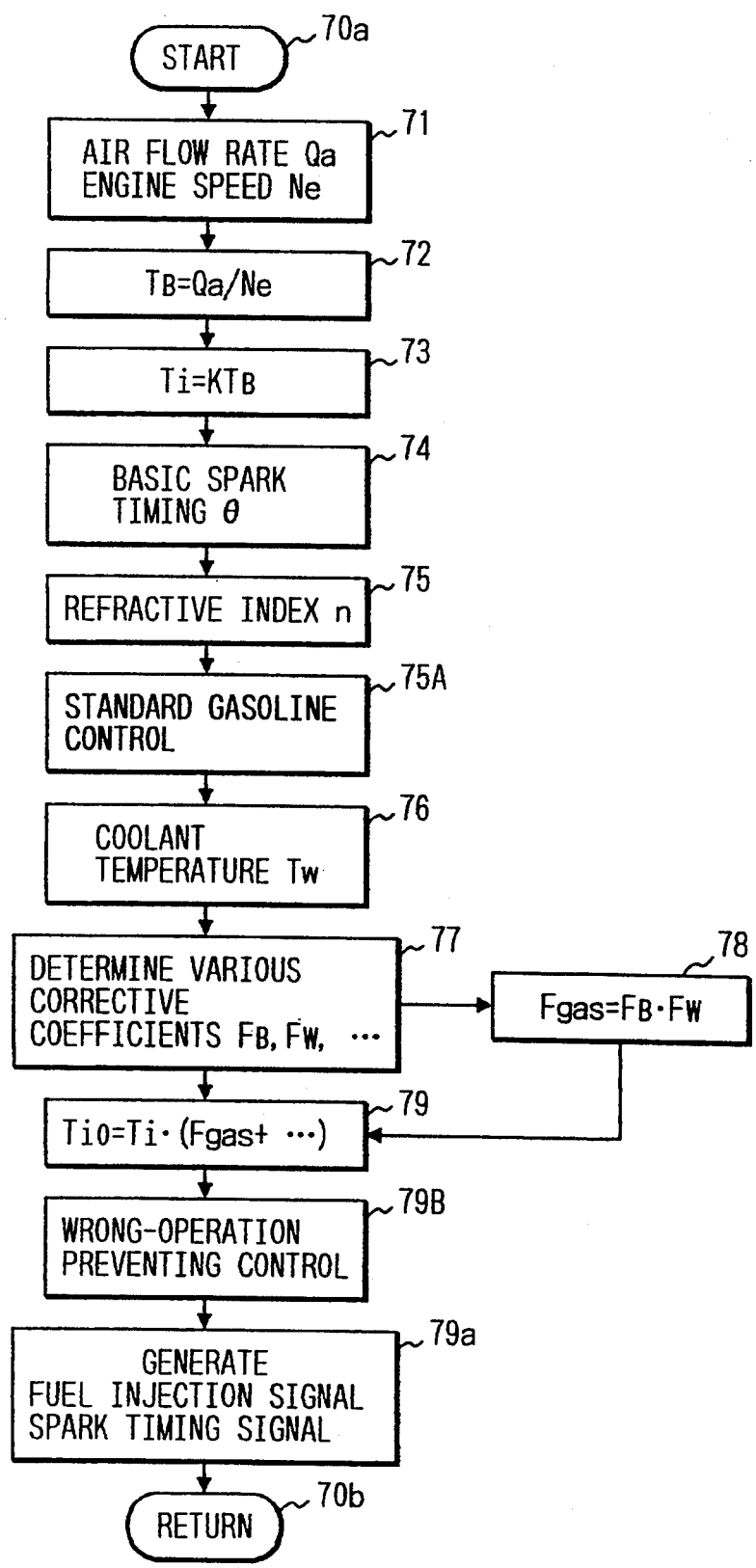
FIG. 3 is a flowchart of a program for controlling a microcomputer of FIG. 2.

The microcomputer 62 includes a combination of an interface, a CPU, a ROM, and a RAM. The microcomputer 62 operates in accordance with a program stored in the ROM. A flowchart of a segment of the program is illustrated in FIG. 3. The operation of the microcomputer 62 is to control a drive circuit 63 and an ignition circuit 64 connected thereto. The drive circuit 63 is electrically connected to the control windings of electrically-driven fuel injection valves 15. The fuel injection valves 15 can be controlled via the drive circuit 63. The ignition circuit 64 is electrically connected to an ignition coil or an ignition winding assembly 16. The ignition coil 16 can be controlled via the ignition circuit 64.

The fuel pump P draws fuel or gasoline from the fuel tank 14 via the fuel passage 14a, and feeds the fuel to the fuel injection valves 15 via a fuel passage 15a. The control windings of the fuel injection valves 15 can be energized by a current which is fed from the battery B via the engine ignition switch IG. The drive circuit 63 periodically and selectively permits and inhibits the energization of the control windings of the fuel injection valves 15 in response to the control signal fed from the microcomputer 62, thereby periodically and selectively opening and closing the fuel injection valves 15. When the fuel injection valves 15 assume open positions, fuel or gasoline driven by the fuel pump P is injected into an intake manifold of the engine body 10a via the fuel injection valves 15. The rate of fuel injection is determined by the control signal fed to the drive circuit 63 from the microcomputer 62.

The ignition coil 16 can be energized by a current fed from the battery B via the engine ignition switch IG. The ignition circuit 64 periodically interrupts and permits the energization of the ignition coil 16 in response to the control signal fed from the microcomputer 62. As a result of the intermittent energization of the ignition coil 16, high voltages occur thereacross at timings determined by the control signal fed to the ignition circuit 64 from the microcomputer 62. The high voltages are sequentially applied to spark plugs in the engine body 10a by the distributor 11. Sparks occur in the plugs when the high voltages are applied thereto.

During operation of the engine 10, air enters the intake passage 13 via the air cleaner 12, and then flows in the intake passage 13 via the throttle valve 18 and a surge tank 13a before reaching the intake manifold. In the intake manifold, the air mixes with the fuel injected from the fuel injection valves 15 so that a mixture of air and fuel occurs. The air-fuel mixture flows into the combustion chambers (cylinders) of the engine body 10a from the intake manifold. In the combustion chambers, the air-fuel mixture is ignited by the spark plugs, and then burns. Consequently, exhaust gas occurs. The exhaust gas moves from the combustion chambers to the exhaust passage 17 before flowing through the exhaust passage 17.

When the ignition switch is closed to start the engine 10, the fuel pump P is activated and the program segment of FIG. 3 is also started at a step 70a. The execution of the program segment of FIG. 3 is reiterated at a predetermined period. As previously described, the microcomputer 62 within the ECU 60 operates in accordance with the program of FIG. 3.

With reference to FIG. 3, a step 71 of the program which follows the step 70a derives the current values of the air flow rate Qa and the rotational engine speed (the rotational speed of the engine output shaft) Ne from the output signals of the air flow rate sensor 30 and the engine rotation sensor 20.

A step 72 subsequent to the step 71 calculates the mount TB of air per rotation of the engine output shaft from the current air flow rate Qa and the current engine speed Ne by referring to the following equation.

$$TB = Qa/Ne$$

A step 73 following the step 72 calculates a basic fuel injection period or interval Ti on the basis of the air amount TB by referring to the following equation.

$$Ti = K \cdot TB$$

where the letter "K" denotes a predetermined constant.

A step 74 following the step 73 determines a basic spark timing $\theta$ by referring to a $\theta$-Qa-Ne map which represents a predetermined relation among the basic spark timing $\theta$, the air flow rate Qa, and the engine speed Ne. The $\theta$-Qa-Ne map is provided in the ROM within the microcomputer 62.

A step 75 subsequent to the step 74 derives the current value of the refractive index "n" of gasoline from the output signal of the gasoline property sensor 40. As previously described, the refractive index "n" of gasoline indicates the degree of poorness or goodness of vaporization characteristics thereof.

The step 75 is followed by a block 75A which executes control for regular or standard gasoline. The details of the block 75A will be described later.

A step 76 subsequent to the block 75A derives the current value of the coolant temperature Tw from the output signal of the coolant temperature sensor 50.

A step 77 following the step 76 determines corrective coefficients FB and FW as will be described hereinafter. In general, as the degree of poorness of vaporization characteristics of gasoline increases, that is, as the 50%-distillation temperature T50 rises, gasoline less evaporates and hence a resultant air-fuel mixture tends to be leaner. To compensate for such a leanness of the air-fuel mixture, it is preferable to increase the rate of fuel injection into the engine 10 in accordance with an increase in the degree of poorness of vaporization characteristics of gasoline.

Figure 5:
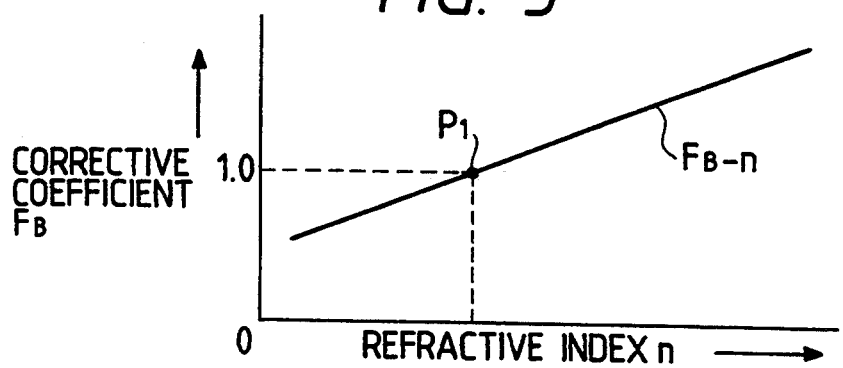
FIG. 5 is a graph of the relation between a corrective coefficient FB and a refractive index "n" of gasoline.

The rate of fuel injection into the engine 10 depends on the basic fuel injection period Ti. As previously described, the refractive index "n" of gasoline is approximately proportional to the 50%-distillation temperature T50. The corrective coefficient FB is designed for correction of the basic fuel injection period Ti. There is a predetermined relation between the corrective coefficient FB and the refractive index "n" of gasoline. According to this relation, as shown in FIG. 5, the corrective coefficient FB increases linearly with the refractive index "n" of gasoline. Predetermined FB-n data representing the predetermined relation between the corrective coefficient FB and the refractive index "n" of gasoline is previously stored into the ROM within the microcomputer 62. In FIG. 5, the character P1 denotes the corrective coefficient FB and the refractive index "n" for regular or standard gasoline. The corrective coefficient FB for regular or standard gasoline is equal to 1.0. The step 77 determines the corrective coefficient FB on the basis of the current refractive index "n" of gasoline by referring to the previously-mentioned predetermined FB-n relation.

Figure 6:
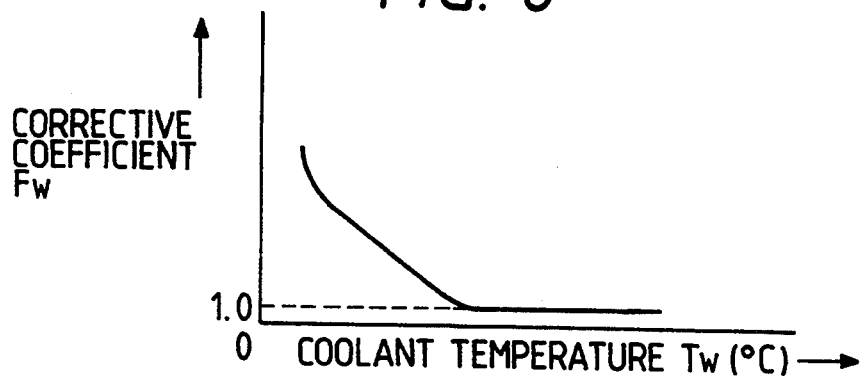
FIG. 6 is a graph of the relation between a corrective coefficient FW and an engine coolant temperature TW.

In general, the affection of the poorness of vaporization characteristics of gasoline upon leanness of an air-fuel mixture increases as the temperature of the engine 10 (for example, the engine coolant temperature TW) drops. Thus, it is preferable to consider the engine temperature or the engine coolant temperature in the correction of the amount of injected fuel according to the degree of poorness of vaporization characteristics of gasoline. Accordingly, to compensate for the previously-mentioned leanness of the air-fuel mixture, it is preferable to vary the corrective coefficient FB in accordance with the engine temperature or the engine coolant temperature. The corrective coefficient FW is designed for correction of the coefficient FB. There is a predetermined relation between the corrective coefficient FW and the engine coolant temperature TW. According to this relation, as shown in FIG. 6, the corrective coefficient FW decreases as the engine coolant temperature TW rises to a given boundary between a cold engine temperature range and a warmed-up engine temperature rage. In addition, the corrective coefficient FW is equal to about 1.0 at temperatures above the given boundary. Predetermined FW-TW data representing the predetermined relation between the corrective coefficient FW and the engine coolant temperature TW is previously stored into the ROM within the microcomputer 62. The step 77 determines the corrective coefficient FW on the basis of the current engine coolant temperature TW by referring to the previously-mentioned predetermined FW-TW relation.

Furthermore, the step 77 determines other various corrective coefficients such as a warmed-up amount-increasing corrective coefficient FWL, an A/F ratio feedback corrective coefficient FAF, and an acceleration amount-increasing corrective coefficient FTCA in a known way. The corrective coefficient FWL is designed to increase the fuel injection rate in accordance with the engine coolant temperature TW under engine warmed-up conditions. The corrective coefficient FAF is used in feedback control of the A/F ratio of an air-fuel mixture which responds to the output signal of the A/F ratio sensor 50a. The corrective coefficient FTCA is designed to increase the fuel injection rate under engine-accelerated conditions.

After the step 77, the program advances to a step 78 which calculates a composite corrective coefficient Fgas from the corrective coefficients FB and FW by referring to the following equation.

$$Fgas = FB \cdot FW$$

A step 79 following the step 78 corrects the basic fuel injection period Ti in accordance with the various corrective coefficients including the corrective coefficients Fgas, FWL, FAF, and FTCA, and thereby calculates a target fuel injection period Tio by referring to the following equation.

$$Tio = Ti\{1 + (Fgas - 1) + (FWL - 1) + (FAF - 1) + (FTCA - 1) + ADD\}$$

where the character ADD denotes the sum of terms equal to the other corrective coefficients minus ones.

The step 79 is followed by a block 79B which executes control for prevention of wrong operation. The details of the block 79B will be described later.

A step 79a generates a spark timing output signal on the basis of the spark timing $\theta$ in connection with the cylinder detection signal outputted from the engine rotation sensor 20. In addition, the step 79a generates a fuel injection output signal on the basis of the target fuel injection period Tio. After the step 79a, the current execution cycle of the program segment of FIG. 3 ends and the program returns to a main routine.

The drive circuit 63 receives the fuel injection output signal from the microcomputer 62, and drives the fuel injection valves 15 in response to the fuel injection output signal. Specifically, the drive circuit 63 intermittently opens the fuel injection valves 15 so that gasoline will be intermittently injected via the fuel injection valves 15 into the intake manifold. Each fuel injection is continued during a period equal to the target fuel injection period Tio.

The ignition circuit 64 receives the spark timing output signal from the microcomputer 62, and controls the ignition coil 16 in response to the spark timing output signal to periodically generate high voltages across the ignition coil 16 at timings determined by the spark timing $\theta$. The high voltages are sequentially applied to the spark plugs so that sparks occur in the plugs.

The control of the rate of fuel injection into the engine 10 results in the control of the A/F ratio of an air-fuel mixture drawn into the combustion chambers of the engine 10. As previously described, the fuel injection rate is corrected in view of not only the affection of the degree of poorness of vaporization characteristics of gasoline on the A/F ratio but also the affection of the engine coolant temperature TW on the A/F ratio. To realize this correction of the fuel injection, the composite corrective coefficient Fgas is introduced which equals the product of the corrective coefficients FB and FW related to the degree of poorness of vaporization characteristics of gasoline and the engine coolant temperature TW. The basic fuel injection period Ti is multiplied by the composite corrective coefficient Fgas, being corrected into the target fuel injection period Tio. As a result, an air-fuel mixture drawn into the combustion chambers of the engine 10 is prevented from becoming lean and is held close to an optimal value (for example, the stoichiometric value) independent of the degree of poorness of vaporization characteristics of gasoline and the engine coolant temperature TW.

As shown in FIGS. 5 and 6, the corrective coefficient FB used in the composite corrective coefficient Fgas has a proportional or linear relation with the refractive index "n" of gasoline, and the corrective coefficient FW used in the composite corrective coefficient Fgas is relatively large at low engine coolant temperatures TW. Thus, the composite corrective coefficient Fgas is relatively large and hence an air-fuel mixture is prevented from becoming lean in a low engine temperature range.

Basically, this embodiment is suited to use of gasoline heavier than regular or standard gasoline. In the case where light gasoline is used, it is preferable to modify this embodiment as follows. An air-fuel mixture tends to be unduly rich when light gasoline is used. In a modification of this embodiment, to compensate for such a richness of the air-fuel mixture, FB-n data is designed so that a corrective coefficient FB will decrease with increases in the refractive index "n" of gasoline.

Figure 11:
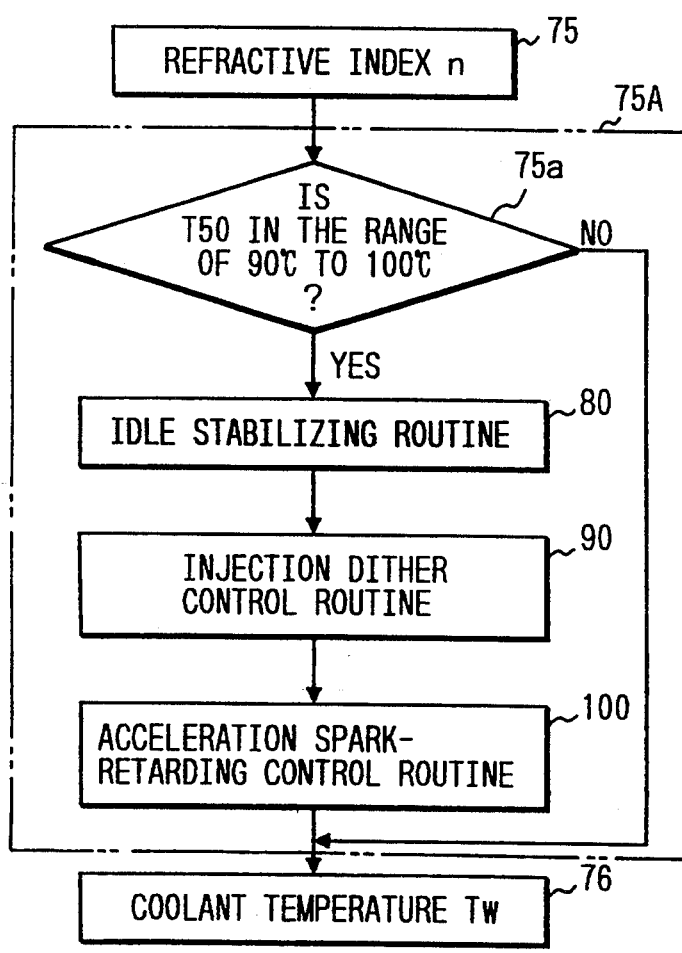
FIG. 11 is a flowchart of a standard-gasoline control block in FIG. 3.

The standard-gasoline control block 75A of FIG. 3 will now be described in detail. As shown in FIG. 11, the standard-gasoline control block 75A includes a step 75a which follows the step 75. The step 75a estimates the 50%-distillation temperature of gasoline on the basis of the refractive index "n" thereof. The step 75a judges whether or not the estimated 50%-distillation temperature of gasoline is in the range of 90° C. to 100° C. which corresponds to standard gasoline. In other words, the step 75a judges whether or not the gasoline fed to the engine 10 is of a standard type. When the gasoline fed to the engine 10 is judged to be of the standard type, the program advances from the step 75a to an idle stabilizing routine 80. Otherwise, the program jumps from the step 75a to the step 76. The idle stabilizing routine 80 is sequentially succeeded by an injection dither control routine 90 and an acceleration spark-retarding control routine 100. After the acceleration spark-retarding control routine 100, the program advances to the step 76.

Figure 12:
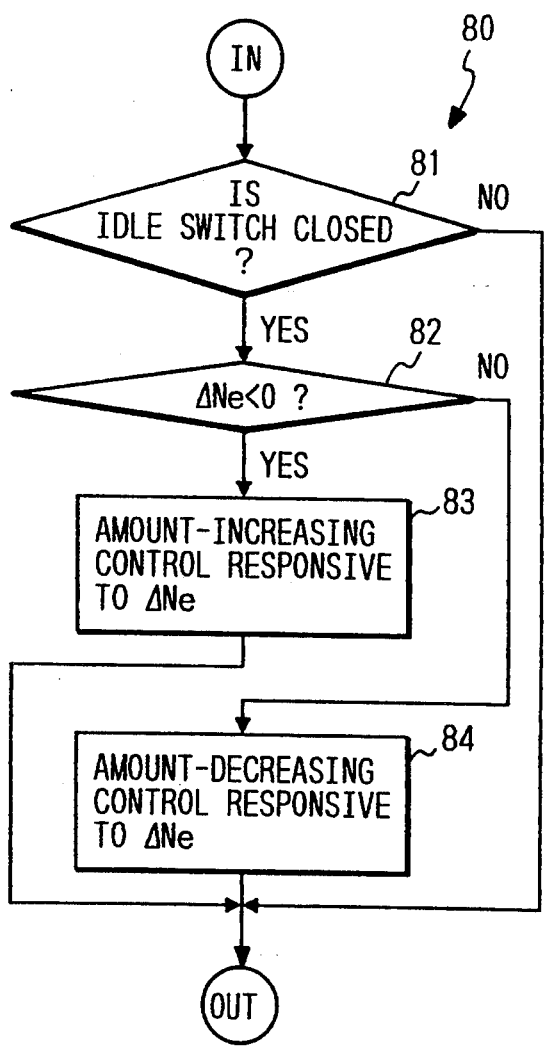
FIG. 12 is a flowchart of an idle stabilizing routine in FIG. 11.

As shown in FIG. 12, the idle stabilizing routine 80 includes a step 81 following the step 75a of FIG. 11. The step 81 judges whether or not the throttle valve 18 is in an idle position by referring to the output signal of the throttle sensor 50b. When the throttle valve 18 is judged to be in the idle position, the program advances from the step 81 to a step 82. Otherwise, the program jumps from the step 81 to the injection dither control routine 90 of FIG. 11. The step 82 calculates the rate or quantity ΔNe of a variation in the rotational engine speed Ne by referring to the output signal of the engine rotation sensor 20. In addition, the step 82 compares the variation quantity ΔNe with zero. Thus, the step 82 detects whether or not the rotational engine speed Ne is decreasing. When the variation quantity ΔNe is smaller than zero, the program advances from the step 82 to a step 83. Otherwise, the program advances from the step 82 to a step 84. The step 83 determines an idle stabilizing corrective coefficient FSTB in response to the variation quantity ΔNe. For example, the corrective coefficient FSTB determined by the step 83 is equal to 1.1. The step 83 multiplies the basic fuel injection period Ti and the corrective coefficient FSTB, and thereby corrects the basic fuel injection period Ti to increase the fuel injection rate. The step 84 determines an idle stabilizing corrective coefficient FSTB in response to the variation amount ΔNe. For example, the corrective coefficient FSTB determined by the step 84 is equal to 0.9. The step 84 multiplies the basic fuel injection period Ti and the corrective coefficient FSTB, and thereby corrects the basic fuel injection period Ti to decrease the fuel injection rate. After the steps 83 and 84, the program advances to the injection dither control routine 90 of FIG. 11. In this way, the fuel injection rate is controlled to hold the rotational engine speed Ne constant while the engine 10 is idling.

Figure 13:
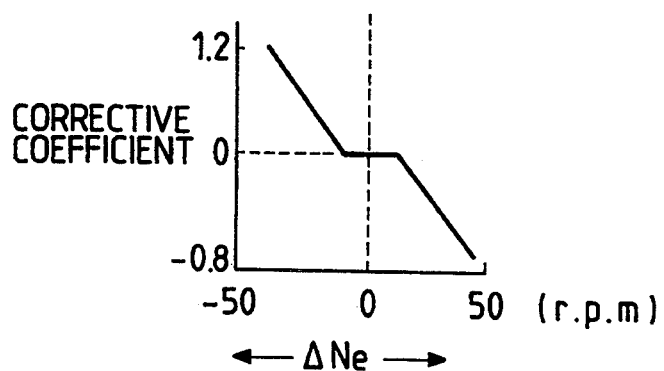
FIG. 13 is a graph of the relation between a corrective coefficient FSTB and an engine speed variation quantity ΔNe.

FIG. 13 shows an example of a predetermined relation between the corrective coefficient FSTB and the engine speed variation quantity ΔNe. Information or data representing this relation is stored in the ROM within the microcomputer 62. The steps 83 and 84 refer to this information when determining the corrective coefficient FSTB.

Figure 14:
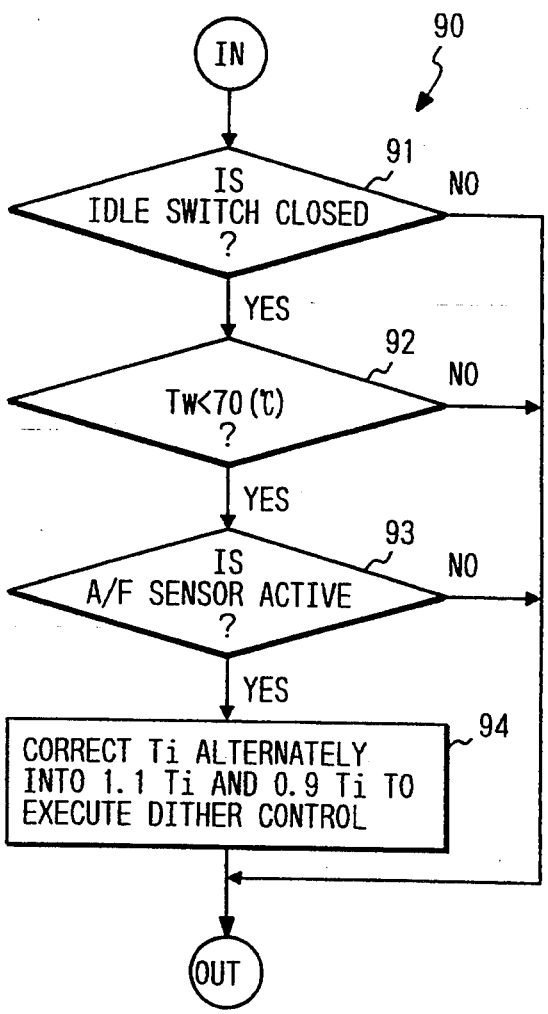
FIG. 14 is a flowchart of an injection dither control routine in FIG. 11.
Figure 15:
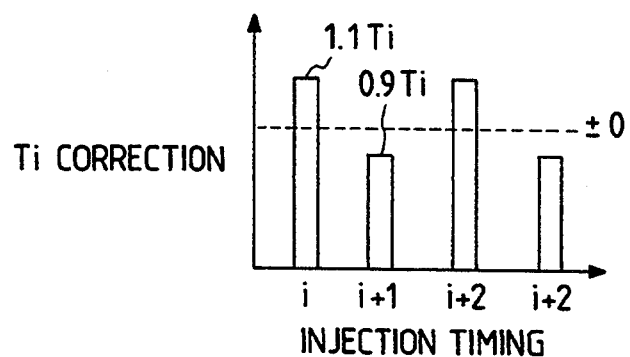
FIG. 15 is a time-domain diagram of a fuel injection period.

As shown in FIG. 14, the injection dither control routine 90 includes a step 91 following the idle stabilizing routine 80 of FIG. 11. The step 91 judges whether or not the throttle valve 18 is in the idle position by referring to the output signal of the throttle sensor 50b. When the throttle valve 18 is judged to be in the idle position, the program advances from the step 91 to a step 92. Otherwise, the program jumps from the step 91 to the acceleration spark-retarding control routine 100 of FIG. 11. The step 92 compares the engine coolant temperature TW with a predetermined temperature TWO equal to, for example, 70° C. When the engine coolant temperature TW is lower than the predetermined temperature TWO, the program advances from the step 92 to a step 93. Otherwise, the program jumps from the step 92 to the acceleration spark-retarding control routine 100 of FIG. 11. The step 93 judges whether or not the A/F ratio sensor 50a is active by referring to the output signal of the A/F ratio sensor 50a. When the A/F ratio sensor 50a is judged to be active, the program advances from the step 93 to a step 94. Otherwise, the program jumps from the step 93 to the acceleration spark-retarding control routine 100 of FIG. 11. The step 94 determines a dither corrective coefficient FDZ. The dither corrective coefficient FDZ is designed so that the basic fuel injection period Ti will be corrected into 1.1 Ti first and will be corrected into 0.9 Ti second. This correction is reiterated. Thus, as shown in FIG. 15, the fuel injection period 1.1 Ti alternates with the injection period 0.9 Ti. In this way, dither control of the fuel injection is realized when the engine 10 is cold. After the step 94, the program advances to the acceleration spark-retarding control routine 100 of FIG. 11.

Figure 16:
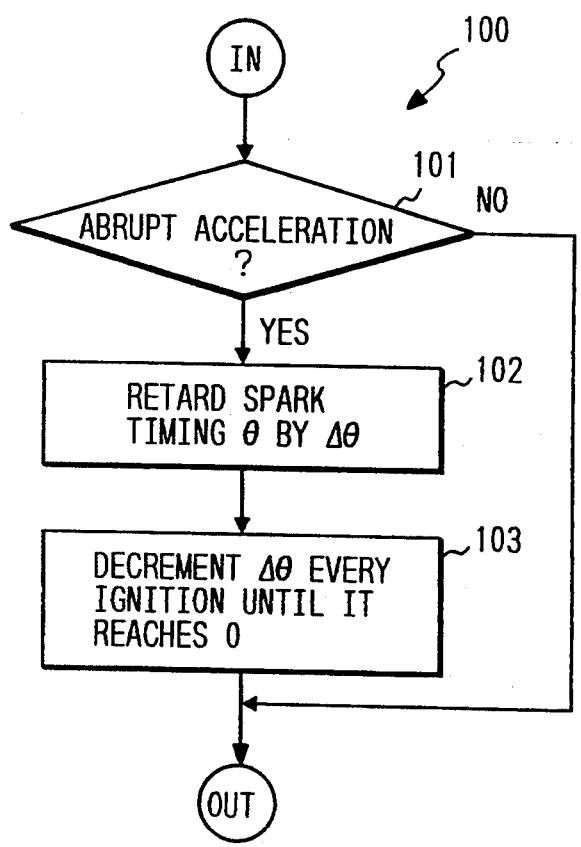
FIG. 16 is a flowchart of an acceleration spark-retarding control routine in FIG. 11.
Figure 17:
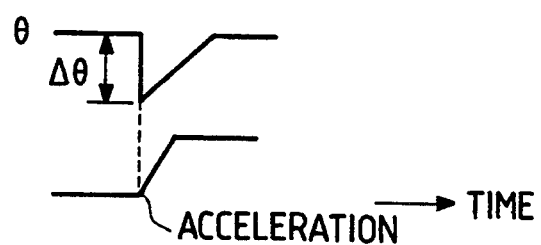
FIG. 17 is a time-domain diagram of a basic spark timing θ and an engine speed.

As shown in FIG. 16, the acceleration spark-retarding control routine 100 includes a step 101 which follows the injection dither control routine 90 of FIG. 11. The step 101 judges whether or not the vehicle is abruptly accelerated. When the vehicle is judged to be abruptly accelerated, the program advances from the step 101 to a step 102. Otherwise, the program jumps from the step 101 to the step 76 of FIG. 3. The step 102 executes a process of retarding the basic spark timing θ by a predetermined interval (a predetermined interval of crank angle) Δθ. Thus, as shown in FIG. 17, the basic spark timing θ is retarded by the predetermined interval Δθ at a moment corresponding to the start of the abrupt acceleration. A step 103 following the step 102 decrements the retardation interval Δθ at every spark timing. Thus, the retardation interval Δθ is reduced to zero at a given rate as shown in FIG. 17. In this way, the spark-retarding control is executed regarding the abrupt acceleration. After the step 103, the program advances to the step 76 of FIG. 3.

As understood from the previous description, in the case where the gasoline fed to the engine 10 differs from standard gasoline, the step 75a of FIG. 11 inhibits the execution of the idle stabilizing routine 80, the injection dither control routine 90, and the acceleration spark-retarding control routine 100. Thus, it is possible to prevent a decrease in the vehicle drivability which might be caused by the routines 80, 90, and 100 in the case of light gasoline or heavy gasoline.

Figure 18:
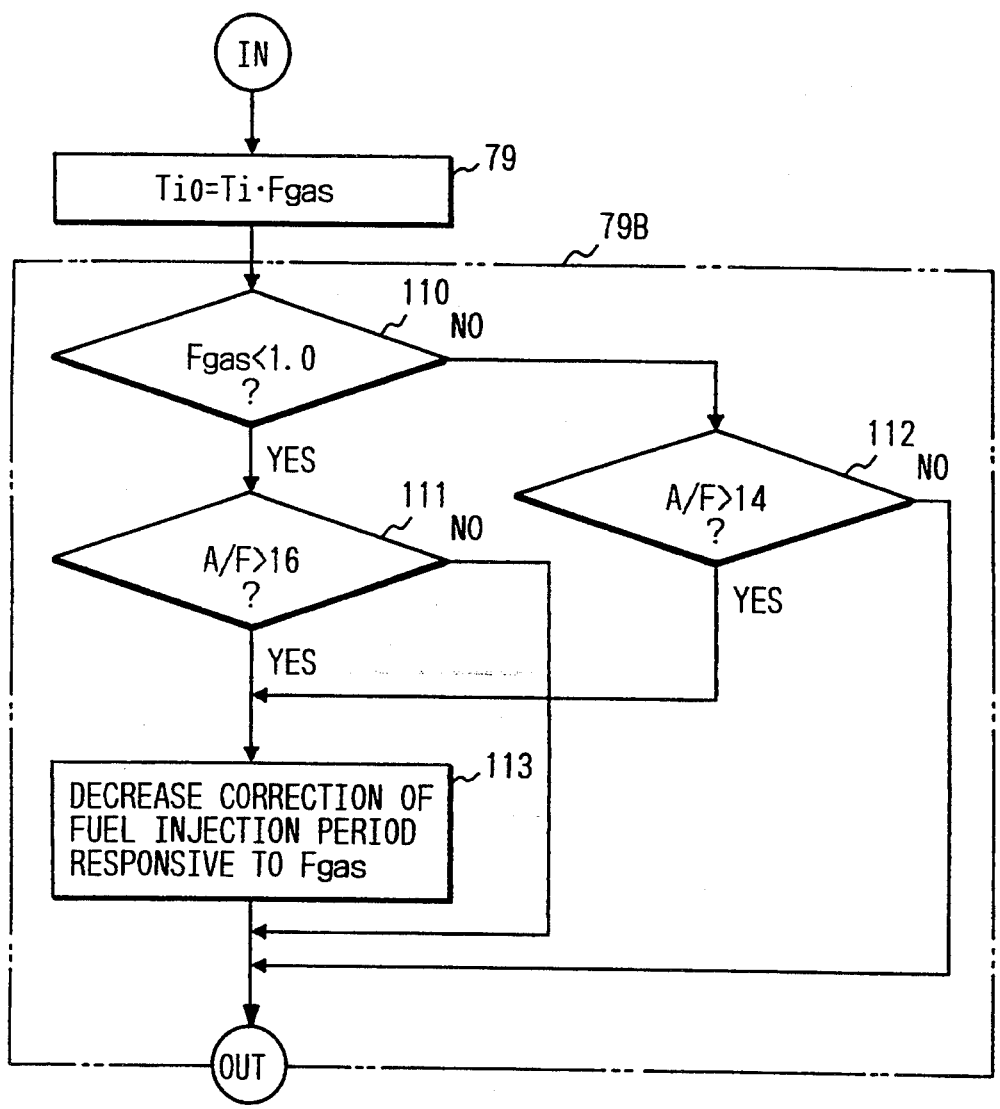
FIG. 18 is a flowchart of a wrong-operation preventing block in FIG. 3.

As shown in FIG. 18, the wrong-operation preventing block 79B includes a step 110 which follows the step 79 of FIG. 3. The step 110 judges whether or not the newest composite corrective coefficient Fgas is smaller than 1.0, that is, whether or not the fuel injection period (the amount of fuel injected during a single injection stroke) is decreasing. When the composite corrective coefficient Fgas is judged to be smaller than 1.0, that is, when the fuel injection period is judged to be decreasing, the program advances from the step 110 to a step 111. Otherwise, the program advances from the step 110 to a step 112. The step 111 judges whether or not the air-fuel mixture drawn into the engine 10 is lean, for example, whether or not the A/F ratio is greater than a predetermined reference ratio by referring to the output signal of the A/F ratio sensor 50a. When the air-fuel mixture is judged to be lean, that is, when the A/F ratio is greater than the predetermined reference ratio, the program advances from the step 111 to a step 113. Otherwise, the program jumps from the step 111 to the step 79a of FIG. 3. For example, the predetermined reference ratio is equal to a value of 16. The predetermined reference ratio may be equal to other values. Data representing the predetermined reference ratio is stored in the ROM within the microcomputer 62. The step 113 which follows the step 111 decreases the quantity of the injection-reducing correction of the fuel injection period responsive to the composite corrective factor Fgas. After the step 113, the program advances to the step 79a of FIG. 3.

Figure 19:
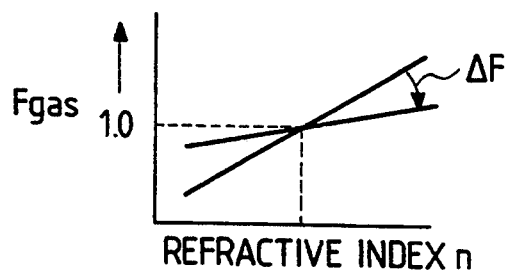
FIG. 19 is a graph of the relation between a corrective value Fgas and a refractive index "n" of gasoline, the relation being changed in accordance with to a quantity ΔF of fuel-injection correction.

In the case where the air-fuel mixture is lean while the fuel injection amount is decreasing, the program successively passes through the steps 110, 111, and 113. In such a case, the fuel injection amount is required to increase but a decrease in the fuel injection amount is actually executed. The execution of the decrease in the fuel injection amount seems to be wrong. It appears that the previously-executed fuel decreasing control results in overshoot and thus the target fuel injection period Tio is unduly decreased. To compensate for such a circumstance, the step 113 decreases the quantity ΔF of the fuel-injection correction responsive to the composite corrective coefficient Fgas as denoted by the arrow in FIG. 19. The decrease in the correction quantity ΔF causes a change of the A/F ratio toward a richer side.

On the other hand, in the case where the air-fuel mixture is not lean while the fuel injection amount is decreasing, the program successively passes through the steps 110, 111, and 79a. In this case, the fuel-decreasing control is executed correctly and thus the program skips the step 113.

When the composite corrective coefficient Fgas is judged to be not smaller than 1.0, that is, when the fuel injection period is judged to be unchanged or increasing, the program advances from the step 110 to the step 112. The step 112 judges whether or not the air-fuel mixture drawn into the engine 10 is rich, for example, whether or not the A/F ratio is smaller than a predetermined reference ratio by referring to the output signal of the A/F ratio sensor 50a. When the air-fuel mixture is judged to be rich, that is, when the A/F ratio is smaller than the predetermined reference ratio, the program advances from the step 112 to the step 113. Otherwise, the program jumps from the step 112 to the step 79a of FIG. 3. For example, the predetermined reference ratio is equal to a value of 14. The predetermined reference ratio may be equal to other values. Data representing the predetermined reference ratio is stored in the ROM within the microcomputer 62. The step 113 which follows the step 112 decreases the quantity of the injection-increasing correction of the fuel injection period responsive to the composite corrective factor Fgas. After the step 113, the program advances to the step 79a of FIG. 3.

In the case where the air-fuel mixture is rich while the fuel injection amount is increasing, the program successively passes through the steps 110, 112, and 113. In such a case, the fuel injection amount is required to decrease but an increase in the fuel injection mount is actually executed. The execution of the increase in the fuel injection amount seems to be wrong. It appears that the previously-executed fuel increasing control results in overshoot and thus the target fuel injection period Tio is unduly increased. To compensate for such a circumstance, the step 113 decreases the quantity ΔF of the fuel-injection correction responsive to the composite corrective coefficient Fgas (see FIG. 19). The decrease in the correction quantity ΔF causes a change of the A/F ratio toward a leaner side.

On the other hand, in the case where the air-fuel mixture is not rich while the fuel injection mount is increasing, the program successively passes through the steps 110, 112, and 79a. In this case, the fuel-increasing control is executed correctly and thus the program skips the step 113.

It should be noted that the coolant temperature sensor 50 may be replaced by other temperature sensors which detect temperatures of the engine 10. The gasoline property sensor 40 may also be of such a type as to detect another physical quantity of gasoline, for example, the specific gravity or the dielectric constant of gasoline.

While the step 113 decreases the quantity ΔF of the fuel-injection correction responsive to the composite corrective coefficient Fgas (see FIG. 19) in this embodiment, the step 113 may reset the fuel-injection correction responsive to the composite corrective coefficient Fgas.

DESCRIPTION OF THE SECOND PREFERRED EMBODIMENT

A second embodiment of this invention is similar to the embodiment of FIGS. 1-6 and 11-19 except for design changes indicated hereinafter.

Figure 7:
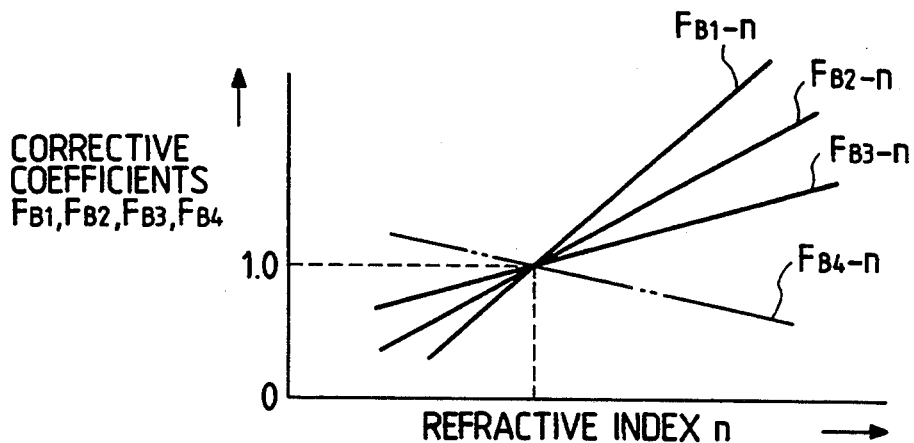
FIG. 7 is a graph of the relation among corrective coefficients FB1-FB4 and a refractive index "n" of gasoline according to a second embodiment of this invention.

The second embodiment uses a plurality of corrective coefficients FB1, FB2, FB3, and FB4 which have predetermined relations with the refractive index "n" of gasoline as shown in FIG. 7. The use of a plurality of the corrective coefficients enables finer correction of a basic fuel injection period Ti in response to operating conditions of an engine 10 (see FIG. 1).

One of the corrective coefficients FB1, FB2, FB3, and FB4 is used in accordance with the operating conditions of the engine 10. Specifically, FB1-n data which determines the relation between the corrective coefficient FB1 and the refractive index "n" of gasoline is used for increasing a fuel injection rate in warmed-up conditions of the engine. FB2-n data which determines the relation between the corrective coefficient FB2 and the refractive index "n" of gasoline is used for correcting the fuel injection rate at and after the start of the engine. FB3-n data which determines the relation between the corrective coefficient FB3 and the refractive index "n" of gasoline is used for increasing the fuel injection rate during a corrective line recovery related to an engine-starting fuel injection period. FB4-n data which determines the relation between the corrective coefficient FB4 and the refractive index "n" of gasoline is used for decreasing the fuel injection rate during the corrective line recovery related to the engine-starting fuel injection period.

In this embodiment, the fuel injection rate is more finely corrected according to the operating conditions of the engine 10, and the degree of poorness of vaporization characteristics of gasoline and an engine coolant temperature TW are considered in the correction of the fuel injection rate.

DESCRIPTION OF THE THIRD PREFERRED EMBODIMENT

A third embodiment of this invention is similar to the embodiment of FIGS. 1-6 and 11-19 except for design changes indicated hereinafter. The third embodiment features that a spark timing is corrected in accordance with the degree of poorness of vaporization characteristics of gasoline and an engine coolant temperature TW.

Figure 8:
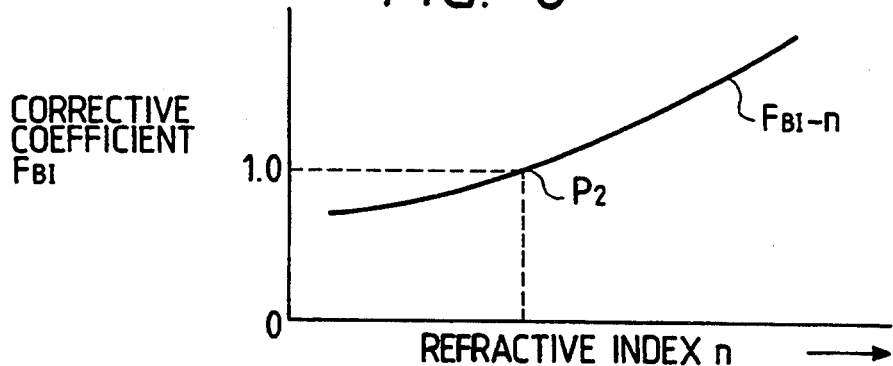
FIG. 8 is a graph of the relation between a corrective coefficient FBI and a refractive index "n" of gasoline according to a third embodiment of this invention.
Figure 10:
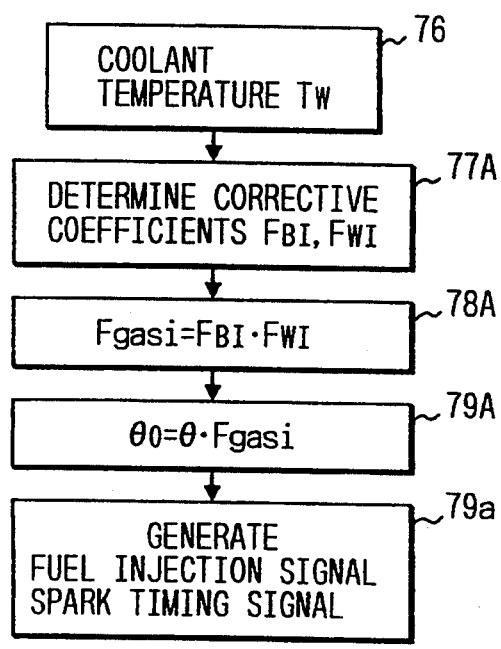
FIG. 10 is a flowchart of a program for controlling a microcomputer in the third embodiment.

In the third embodiment, as shown in FIG. 10, a program step 76 is followed by a step 77A which determines corrective coefficients FBI and FWI as will be described hereinafter. In general, as the degree of poorness of vaporization characteristics of gasoline increases, that is, as the 50%-distillation temperature T50 rises, gasoline less evaporates and hence an air-fuel mixture tends to be leaner. In addition, the torque output of an engine 10 (see FIG. 1) tends to be reduced when an air-fuel mixture becomes lean. An advance of the spark timing in the engine 10 can compensate for such a torque reduction. The corrective coefficient FBI is designed for correcting a basic spark timing $\theta$ determined by a step 74 (see FIG. 3). There is a predetermined relation between the corrective coefficient FBI and the refractive index "n" of gasoline. According to this relation, as shown in FIG. 8, the corrective coefficient FBI increases approximately linearly with the refractive index "n" of gasoline. Predetermined FBI-n data representing the predetermined relation between the corrective coefficient FBI and the refractive index "n" of gasoline is previously stored into a ROM within a microcomputer 62 (see FIG. 2). In FIG. 8, the character P2 denotes the corrective coefficient FBI and the refractive index "n" for regular or standard gasoline. The corrective coefficient FBI for regular or standard gasoline is equal to 1.0. The step 77A determines the corrective coefficient FBI on the basis of the current refractive index "n" of gasoline by referring to the previously-mentioned predetermined FBI-n relation.

Figure 9:
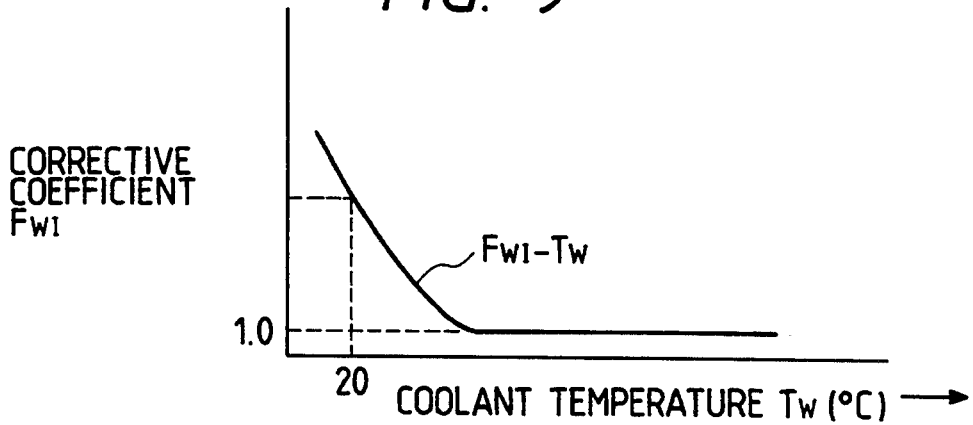
FIG. 9 is a graph of the relation between a corrective coefficient FWI and an engine coolant temperature TW in the third embodiment.

In general, a reduction of the engine torque output due to a change of an air-fuel mixture to a leaner side tends to be greater as the temperature of the engine 10 (for example, the engine coolant temperature TW) drops. Thus, it is preferable to correct the basic spark timing $\theta$ in accordance with the engine temperature or the engine coolant temperature TW. Accordingly, to compensate for the previously-mentioned reduction of the engine torque output, it is preferable to vary the corrective coefficient FBI in accordance with the engine temperature or the engine coolant temperature. The corrective coefficient FWI is designed for correction of the coefficient FBI. There is a predetermined relation between the corrective coefficient FWI and the engine coolant temperature TWI. According to this relation, as shown in FIG. 9, the corrective coefficient FWI decreases as the engine coolant temperature TW rises to a given boundary between a cold engine temperature range and a warmed-up engine temperature range. In addition, the corrective coefficient FWI is equal to about 1.0 at temperatures above the given boundary. Predetermined FWI-TW data representing the predetermined relation between the corrective coefficient FWI and the engine coolant temperature TW is previously stored into the ROM within the microcomputer 62. The step 77A determines the corrective coefficient FWI on the basis of the current engine coolant temperature TW by referring to the previously-mentioned predetermined FWI-TW relation.

After the step 77A, the program advances to a step 78A which calculates a composite corrective coefficient Fgasi from the corrective coefficients FBI and FWI by referring to the following equation.

$$Fgasi = FBI \cdot FWI$$

A step 79A following the step 78A corrects the basic spark timing $\theta$ in accordance with the composite corrective coefficient Fgasi, and thereby calculates a target spark timing $\theta o$ by referring to the following equation.

$$\theta o = \theta \cdot Fgasi$$

The step 79A is followed by a step 79a which generates a spark timing output signal on the basis of the target spark timing $\theta o$ in connection with a cylinder detection signal outputted from an engine rotation sensor 20 (see FIG. 1). In addition, the step 79a generates a fuel injection output signal on the basis of a basic fuel injection period Ti determined by a step 73 (see FIG. 3). After the step 79a, the current execution cycle of a program segment of FIG. 10 ends and the program returns to a main routine.

A drive circuit 63 (see FIG. 2) receives the fuel injection output signal from the microcomputer 62, and drives fuel injection valves 15 (see FIG. 1) in response to the fuel injection output signal. Specifically, the drive circuit 63 intermittently opens the fuel injection valves 15 so that gasoline will be intermittently injected via the fuel injection valves 15 into an intake manifold. Each fuel injection is continued during a period equal to the basic fuel injection period Ti.

An ignition circuit 64 (see FIG. 2) receives the spark timing output signal from the microcomputer 62, and controls an ignition coil 16 (see FIG. 1) in response to the spark timing output signal to periodically generate high voltages across the ignition coil 16 at timings determined by the target spark timing $\theta o$. The high voltages are sequentially applied to the spark plugs so that sparks occur in the plugs.

The control of the spark timing in the engine 10 results in the control of the torque output of the engine 10. As previously described, the spark timing is corrected in view of not only the affection of the degree of poorness of vaporization characteristics of gasoline on the engine torque output but also the affection of the engine coolant temperature TW on the engine torque output. To realize this correction of the spark timing, the composite corrective coefficient Fgasi is introduced which equals the product of the corrective coefficients FBI and FWI related to the degree of poorness of vaporization characteristics of gasoline and the engine coolant temperature TW. The basic spark timing $\theta$ is multiplied by the composite corrective coefficient Fgasi, being corrected into the target spark timing $\theta o$. As a result, the spark timing is optimized so that the torque output of the engine 10 can be suitably kept independent of variations in the degree of poorness of vaporization characteristics of gasoline and the engine coolant temperature TW.

As shown in FIGS. 8 and 9, the corrective coefficient FBI used in the composite corrective coefficient Fgasi has a proportional or linear relation with the refractive index "n" of gasoline, and the corrective coefficient FWI used in the composite corrective coefficient Fgasi is relatively large at low engine coolant temperatures TW. Thus, the composite corrective coefficient Fgasi is relatively large and hence the spark timing is maintained at a suitable timing under conditions where the engine 10 is operating at low temperatures and gasoline fed to the engine 10 is of a heavy type.

This embodiment may be modified as follows. A modification of this embodiment includes a combination of the program segments of FIGS. 3 and 10. In this modification, both a fuel injection rate and a spark timing are corrected in accordance with the degree of poorness of vaporization characteristics of gasoline and an engine coolant temperature.

DESCRIPTION OF THE FOURTH PREFERRED EMBODIMENT

A fourth embodiment of this invention is similar to the embodiment of FIGS. 1–6 and 11–19 except for design changes indicated hereinafter. The throttle sensor 50b (see FIG. 1) is omitted from the fourth embodiment. In addition, the standard-gasoline control step 75A (see FIG. 3) is omitted from the fourth embodiment. In the fourth embodiment, the wrong-operation preventing block 79B of FIG. 3 is modified as follows.

Figure 20:
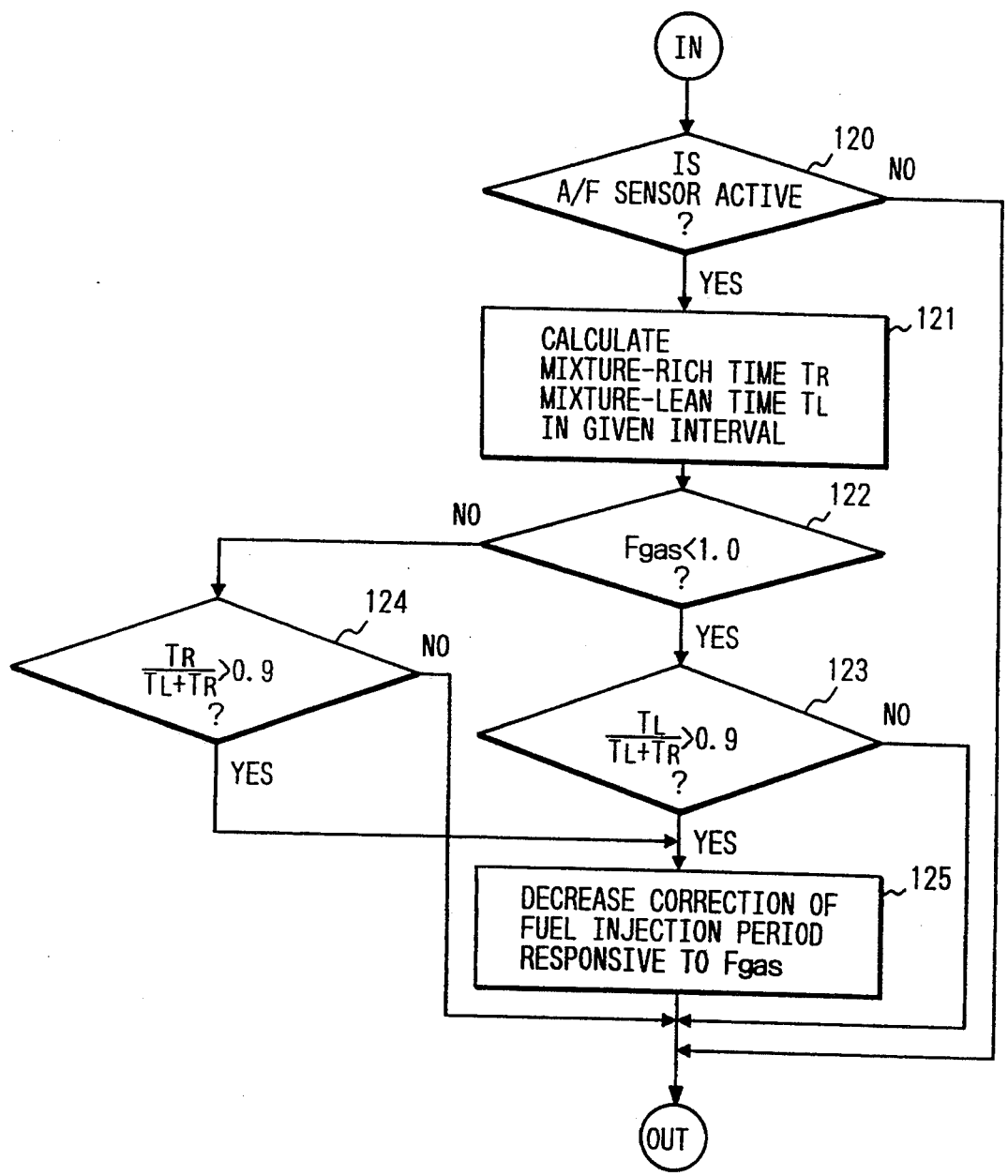
FIG. 20 is a flowchart of a wrong-operation preventing block in a fourth embodiment of this invention.

As shown in FIG. 20, the wrong-operation preventing block 79B in the fourth embodiment includes a step 120 which follows the step 79 of FIG. 3. The step 120 judges whether or not the A/F ratio sensor 50a is active by referring to the output signal of the A/F ratio sensor 50a. When the A/F ratio sensor 50a is judged to be active, the program advances from the step 120 to a step 121. Otherwise, the program jumps from the step 120 to the step 79a of FIG. 3.

Figure 21:
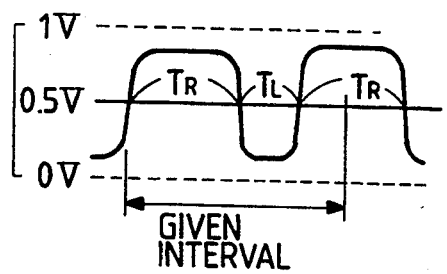
FIG. 21 is a time-domain diagram of the output signal of an A/F ratio sensor.

The step 121 calculates the sum of periods TR and the sum of periods TL during a predetermined interval of time which is equal to, for example, 3 seconds (see FIG. 21). The periods TR and TL are defined as follows. During the periods TR, the output signal of the A/F ratio sensor 50a indicates that the air-fuel mixture is rich. During the periods TL, the output signal of the A/F ratio sensor 50a indicates that the air-fuel mixture is lean. The sum of the periods TR is also denoted by the character TR. The sum of the periods TL is also denoted by the character TL.

A step 122 following the step 121 judges whether or not the newest composite corrective coefficient Fgas is smaller than 1.0, that is, whether or not the fuel injection period (the amount of fuel injected during a single injection stroke) is decreasing. When the composite corrective coefficient Fgas is judged to be smaller than 1.0, that is, when the fuel injection period is judged to be decreasing, the program advances from the step 122 to a step 123. Otherwise, the program advances from the step 122 to a step 124.

The step 123 calculates the value equal to TL/(TL+TR). In addition, the step 123 judges whether or not the air-fuel mixture drawn into the engine 10 is lean, and specifically whether or not the value TL/(TL+TR) is greater than a predetermined reference value. When the air-fuel mixture is judged to be lean, that is, when the value TL/(TL+TR) is greater than the predetermined reference value, the program advances from the step 123 to a step 125. Otherwise, the program jumps from the step 123 to the step 79a of FIG. 3. For example, the predetermined reference value is equal to a value of 0.9. The predetermined reference value may be equal to other values. Data representing the predetermined reference value is stored in the ROM within the microcomputer 62.

The step 125 which follows the step 123 decreases the quantity of the injection-reducing correction of the fuel injection period responsive to the composite corrective factor Fgas. After the step 125, the program advances to the step 79a of FIG. 3.

In the case where the air-fuel mixture is lean while the fuel injection amount is decreasing, the program successively passes through the steps 122, 123, and 125. In such a case, the fuel injection amount is required to increase but a decrease in the fuel injection amount is actually executed. The execution of the decrease in the fuel injection amount seems to be wrong. It appears that the previously-executed fuel decreasing control results in overshoot and thus the target fuel injection period Tio is unduly decreased. To compensate for such a circumstance, the step 125 decreases the quantity $\Delta F$ of the fuel-injection correction responsive to the composite corrective coefficient Fgas as denoted by the arrow in FIG. 19. The decrease in the correction quantity $\Delta F$ causes a change of the A/F ratio toward a richer side.

On the other hand, in the case where the air-fuel mixture is not lean while the fuel injection amount is decreasing, the program successively passes through the steps 122, 123, and 79a. In this case, the fuel-decreasing control is executed correctly and thus the program skips the step 125.

When the composite corrective coefficient Fgas is judged to be not smaller than 1.0, that is, when the fuel injection period is judged to be unchanged or increasing, the program advances from the step 122 to the step 124. The step 124 calculates the value equal to TR/(TL+TR). In addition, the step 124 judges whether or not the air-fuel mixture drawn into the engine 10 is rich, and specifically whether or not the value TR/(TL+TR) is greater than a predetermined reference value. When the air-fuel mixture is judged to be rich, that is, when the value TR/(TL+TR) is greater than the predetermined reference value, the program advances from the step 124 to the step 125. Otherwise, the program jumps from the step 124 to the step 79a of FIG. 3. For example, the predetermined reference value is equal to a value of 0.9. The predetermined reference value may be equal to other values. Data representing the predetermined reference value is stored in the ROM within the microcomputer 62.

The step 125 which follows the step 124 decreases the quantity of the injection-increasing correction of the fuel injection period responsive to the composite corrective factor Fgas. After the step 125, the program advances to the step 79a of FIG. 3.

In the case where the air-fuel mixture is rich while the fuel injection amount is increasing, the program successively passes through the steps 122, 124, and 125. In such a case, the fuel injection amount is required to decrease but an increase in the fuel injection amount is actually executed. The execution of the increase in the fuel injection mount seems to be wrong. It appears that the previously-executed fuel increasing control results in overshoot and thus the target fuel injection period Tio is unduly increased. To compensate for such a circumstance, the step 125 decreases the quantity ΔF of the fuel-injection correction responsive to the composite corrective coefficient Fgas (see FIG. 19). The decrease in the correction quantity ΔF causes a change of the A/F ratio toward a leaner side.

On the other hand, in the case where the air-fuel mixture is not rich while the fuel injection amount is increasing, the program successively passes through the steps 122, 124, and 79a. In this case, the fuel-increasing control is executed correctly and thus the program skips the step 125.

While the step 125 decreases the quantity ΔF of the fuel-injection correction responsive to the composite corrective coefficient Fgas (see FIG. 19) in this embodiment, the step 125 may reset the fuel-injection correction responsive to the composite corrective coefficient Fgas.

DESCRIPTION OF THE FIFTH PREFERRED EMBODIMENT

A fifth embodiment of this invention is similar to the embodiment of FIGS. 1-6 and 11-19 except for design changes indicated hereinafter. The throttle sensor 50b (see FIG. 1) is omitted from the fifth embodiment. In addition, the standard-gasoline control step 75A (see FIG. 3) is omitted from the fifth embodiment. In the fifth embodiment, the wrong-operation preventing block 79B of FIG. 3 is modified as follows.

As shown in FIG. 22, the wrong-operation preventing block 79B in the fifth embodiment includes a step 130 which follows the step 79 of FIG. 3. The step 130 judges whether or not the A/F ratio sensor 50a is active by referring to the output signal of the A/F ratio sensor 50a. When the A/F ratio sensor 50a is judged to be active, the program advances from the step 130 to a step 131. Otherwise, the program jumps from the step 130 to the step 79a of FIG. 3.

The step 131 Judges whether or not PID (proportional, integral, and differential) feedback control of the A/F ratio is being executed by referring to, for example, the output signal of the A/F ratio sensor 50a. When the feedback control is judged to be being executed, the program advances from the step 131 to a step 132. Otherwise, the program jumps from the step 131 to the step 79a of FIG. 3.

The step 132 calculates the arithmetical mean value FAFA among A/F ratio correction values which occur immediately before A/F ratio rich skips S 1 and A/F ratio lean skips S2 (see FIG. 23).

A step 133 following the step 132 judges whether or not the newest composite corrective coefficient Fgas is smaller than 1.0, that is, whether or not the fuel injection period (the amount of fuel injected during a single injection stroke) is decreasing. When the composite corrective coefficient Fgas is judged to be smaller than 1.0, that is, when the fuel injection period is judged to be decreasing, the program advances from the step 133 to a step 134. Otherwise, the program advances from the step 133 to a step 135.

The step 134 judges whether or not the air-fuel mixture drawn into the engine 10 is lean, and specifically whether or not the mean value FAFA is greater than a predetermined reference value. When the air-fuel mixture is judged to be lean, that is, when the mean value FAFA is greater than the predetermined reference value, the program advances from the step 134 to a step 136. Otherwise, the program jumps from the step 134 to the step 79a of FIG. 3. For example, the predetermined reference value is equal to a value of 1.1. The predetermined reference value may be equal to other values. Data representing the predetermined reference value is stored in the ROM within the microcomputer 62.

The step 136 which follows the step 134 decreases the quantity of the injection-reducing correction of the fuel injection period responsive to the composite corrective factor Fgas. After the step 136, the program advances to the step 79a of FIG. 3.

In the case where the air-fuel mixture is lean while the fuel injection amount is decreasing, the program successively passes through the steps 133, 134, and 136. In such a case, the fuel injection amount is required to increase but a decrease in the fuel injection amount is actually executed. The execution of the decrease in the fuel injection amount seems to be wrong. It appears that the previously-executed fuel decreasing control results in overshoot and thus the target fuel injection period Tio is unduly decreased. To compensate for such a circumstance, the step 136 decreases the quantity ΔF of the fuel-injection correction responsive to the composite corrective coefficient Fgas as denoted by the arrow in FIG. 19. The decrease in the correction quantity ΔF causes a change of the A/F ratio toward a richer side.

On the other hand, in the case where the air-fuel mixture is not lean while the fuel injection amount is decreasing, the program successively passes through the steps 133, 134, and 79a. In this case, the fuel-decreasing control is executed correctly and thus the program skips the step 136.

When the composite corrective coefficient Fgas is judged to be not smaller than 1.0, that is, when the fuel injection period is judged to be unchanged or increasing, the program advances from the step 133 to the step 135. The step 135 judges whether or not the air-fuel mixture drawn into the engine 10 is rich, and specifically whether or not the mean value FAFA is smaller than a predetermined reference value. When the air-fuel mixture is judged to be rich, that is, when the mean value FAFA is smaller than the predetermined reference value, the program advances from the step 135 to the step 136. Otherwise, the program jumps from the step 135 to the step 79a of FIG. 3. For example, the predetermined reference value is equal to a value of 0.9. The predetermined reference value may be equal to other values. Data representing the predetermined reference value is stored in the ROM within the microcomputer 62.

The step 136 which follows the step 135 decreases the quantity of the injection-increasing correction of the fuel injection period responsive to the composite corrective factor Fgas. After the step 136, the program advances to the step 79a of FIG. 3.

In the case where the air-fuel mixture is rich while the fuel injection amount is increasing, the program successively passes through the steps 133, 135, and 136. In such a case, the fuel injection amount is required to decrease but an increase in the fuel injection amount is actually executed. The execution of the increase in the fuel injection mount seems to be wrong. It appears that the previously-executed fuel increasing control results in overshoot and thus the target fuel injection period Tio is unduly increased. To compensate for such a circumstance, the step 136 decreases the quantity ΔF of the fuel-injection correction responsive to the composite corrective coefficient Fgas (see FIG. 19). The decrease in the correction quantity ΔF causes a change of the A/F ratio toward a leaner side.

On the other hand, in the case where the air-fuel mixture is not rich while the fuel injection amount is increasing, the program successively passes through the steps 133, 135, and 79a. In this case, the fuel-increasing control is executed correctly and thus the program skips the step 136.

While the step 136 decreases the quantity ΔF of the fuel-injection correction responsive to the composite corrective coefficient Fgas (see FIG. 19) in this embodiment, the step 136 may reset the fuel-injection correction responsive to the composite corrective coefficient Fgas.

DESCRIPTION OF THE SIXTH PREFERRED EMBODIMENT

Figure 24:
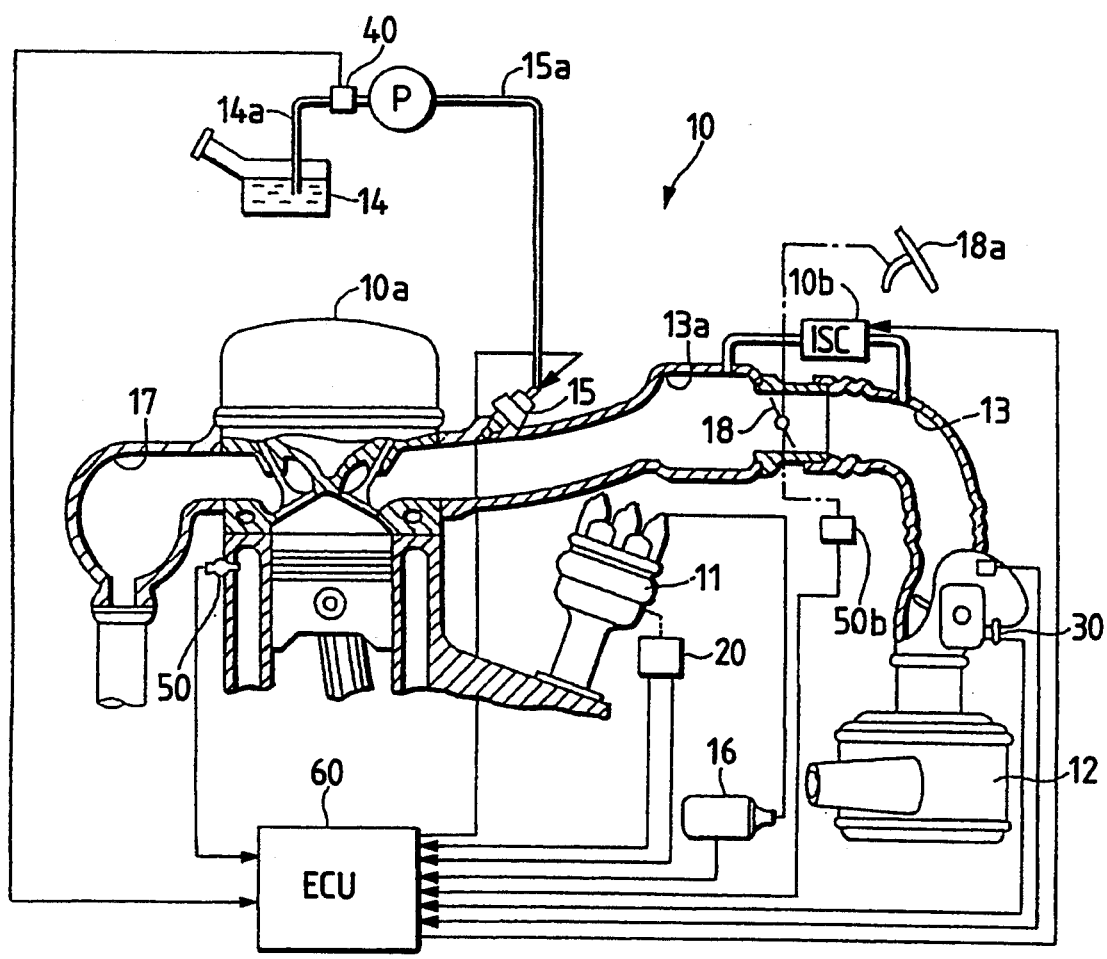
FIG. 24 is a diagram of an electronic control system according to a sixth embodiment of this invention.

FIG. 24 shows a sixth embodiment of this invention which is similar to the embodiment of FIGS. 1-6 and 11-19 except for design changes indicated hereinafter.

Figure 25:
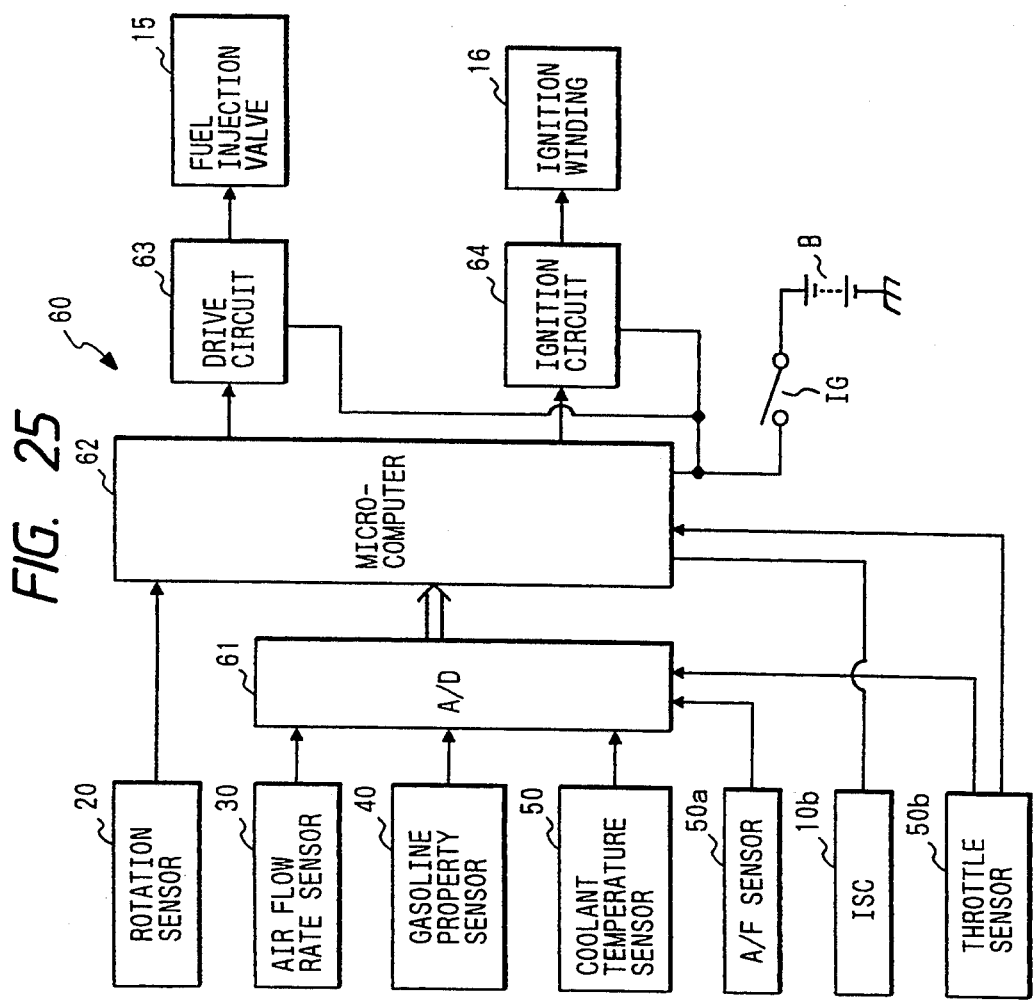
FIG. 25 is a block diagram of the electronic control system in the sixth embodiment.

The embodiment of FIG. 24 includes an idle speed control (ISC) device 10b connected to an air intake passage 13. As shown in FIG. 25, the ISC device 10b is electrically connected to a microcomputer 62 so that the ISC device 10b can be controlled by the microcomputer 62.

The standard-gasoline control step 75A (see FIG. 3) is omitted from the sixth embodiment. In the sixth embodiment, the wrong-operation preventing block 79B of FIG. 3 is modified as follows.

Figure 26:
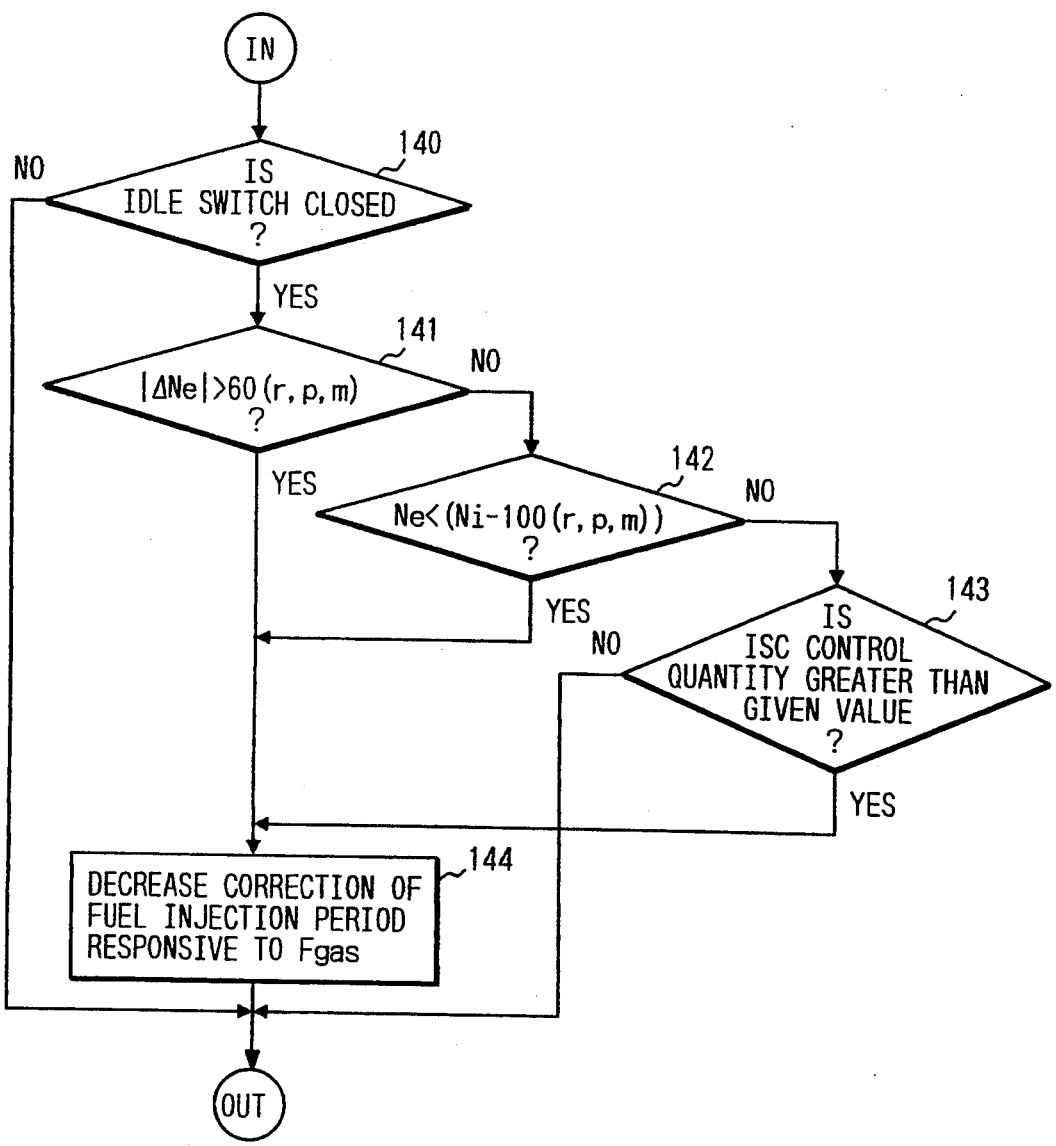
FIG. 26 is a flowchart of a wrong-operation preventing segment of a program for controlling a microcomputer in the sixth embodiment.

As shown in FIG. 26, the wrong-operation preventing block 79B in the sixth embodiment includes a step 140 which follows the step 79 of FIG. 3. The step 140 judges whether or not the throttle valve 18 is in an idle position by referring to the output signal of the throttle sensor 50b. When the throttle valve 18 is judged to be in the idle position, the program advances from the step 140 to a step 141. Otherwise, the program jumps from the step 140 to the step 79a of FIG. 3.

Figure 27:
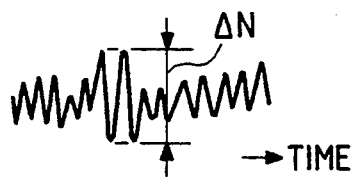
FIG. 27 is a time-domain diagram of an idle engine speed.

The step 141 calculates a variation ΔNe in the rotational engine speed Ne by referring to the output signal of the engine rotation sensor 20. In addition, the step 141 calculates the absolute value of the engine speed variation ΔNe. Then, the step 141 compares the calculated absolute value of the engine speed variation ΔNe with a predetermined value equal to, for example, 60 r.p.m. The predetermined value indicates an allowable range of rough idling conditions of the engine 10 which might be caused by making the air-fuel mixture rich or lean (see FIG. 27). Data representing the predetermined value is stored in the ROM within the microcomputer 62. It is preferable to adjust the predetermined value according to characteristics of the engine 10. When the absolute value of the engine speed variation ΔNe is greater than the predetermined value, that is, when the air-fuel mixture is rich or lean so that the engine speed variation ΔNe is excessively great, the program advances from the step 141 to a step 144. Otherwise, the program advances from the step 141 to a step 142.

The step 144 decreases the quantity of the injection-injection correction of the fuel injection period responsive to the composite corrective factor Fgas. After the step 144, the program advances to the step 79a of FIG. 3.

During the engine idling operation, in the case where the air-fuel mixture is rich or lean and the engine speed variation ΔNe is excessively great, the program successively passes through the steps 141 and 144. In such a case, the fuel injection controlled amount is required to decrease or increase but an increase or a decrease in the fuel injection amount is actually executed. The execution of the decrease or increase in the fuel injection mount seems to be wrong. It appears that the previously-executed fuel decreasing or increasing control results in overshoot and thus the target fuel injection period Tio is unduly changed. To compensate for such a circumstance, the step 144 decreases the quantity ΔF of the fuel-injection correction responsive to the composite corrective coefficient Fgas as denoted by the arrow in FIG. 19. The decrease in the correction quantity ΔF causes a change of the A/F ratio toward an appropriate point.

The step 142 calculates a value which equals an idle setting speed Ni minus a predetermined value, for example, 100 r.p.m. Then, the step 142 compares the current rotational engine speed Ne with the value "Ni-100". When the rotational engine speed Ne is smaller than the value "Ni-100", the program advances from the step 142 to the step 144. Otherwise, the program advances from the step 142 to a step 143. As previously described, the step 144 decreases the quantity of the injection-injection correction of the fuel injection period responsive to the composite corrective factor Fgas. After the step 144, the program advances to the step 79a of FIG. 3.

Figure 28:
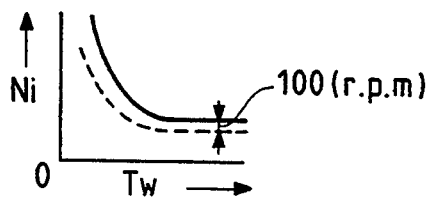
FIG. 28 is a graph of the relation between an idle setting speed Ni and an engine coolant temperature TW.

As shown in FIG. 28, the idle setting speed Ni varies with the engine coolant temperature TW according to a hyperbola. When the engine speed Ne is considerably smaller than the idle setting speed Ni, the engine 10 tends to fall into unacceptably rough idling conditions regardless of whether the air-fuel mixture is lean or rich. Such a tendency is more conspicuous in the case where heavy gasoline is used and the air-fuel mixture becomes over-lean, or in the case where light gasoline is used and the air-fuel mixture becomes over-rich. The value "Ni-100" is set to a lower speed limit at which stable engine idling operation can be maintained. Data representing the value "Ni-100" is stored in the ROM within the microcomputer 62. The related predetermined value may be different from 100 r.p.m. The previously-mentioned tendency toward unacceptably rough idling conditions is compensated by the execution of the steps 142 and 144.

As previously described, when the rotational engine speed Ne is not smaller than the value "Ni-100", the program advances from the step 142 to the step 143. The step 143 calculates an ISC control amount which is equal to the difference between the idle setting speed Ni and the actual current idling speed Ne. Then, the step 143 compares the ISC control mount with a predetermined control mount equal to, for example, 50%. The predetermined control amount is chosen so that the engine 10 can be prevented from falling into unacceptably rough idling conditions. Data representing the predetermined control amount is stored in the ROM within the microcomputer 62. When the ISC control amount is greater than the predetermined control amount, the amount of control by the ISC device 10b is judged to be excessively large and the program advances from the step 143 to the step 144. Otherwise, the amount of control by the ISC device 10b is judged to be good and the program advances from the step 143 to the step 79a of FIG. 3. As previously described, the step 144 decreases the quantity of the injection-injection correction of the fuel injection period responsive to the composite corrective factor Fgas. After the step 144, the program advances to the step 79a of FIG. 3.

The step 79a of FIG. 3 generates an ISC control signal on the basis of the ISC control amount. The ISC control signal is outputted from the microcomputer 62 to the ISC device 10b so that the ISC device 10b will be controlled in accordance with the ISC control mount. The control of the ISC device 10b is designed so that the idling speed of the engine 10 can be maintained at essentially the idle setting speed Ni.

The steps 141, 142, and 143 serve to detect given conditions which tend to cause unacceptably rough engine idling. When such conditions are detected, the program advances from the steps 141, 142, and 143 to the step 144 which decreases the quantity of the injection-injection correction of the fuel injection period responsive to the composite corrective factor Fgas. As a result, the engine 10 can be prevented from unacceptably roughly idling even in the case where heavy gasoline is fed to the engine 10.

While the step 144 decreases the quantity of the fuel-injection correction responsive to the composite corrective coefficient Fgas in this embodiment, the step 144 may reset the fuel-injection correction responsive to the composite corrective coefficient Fgas.

DESCRIPTION OF THE SEVENTH PREFERRED EMBODIMENT

Figure 29:
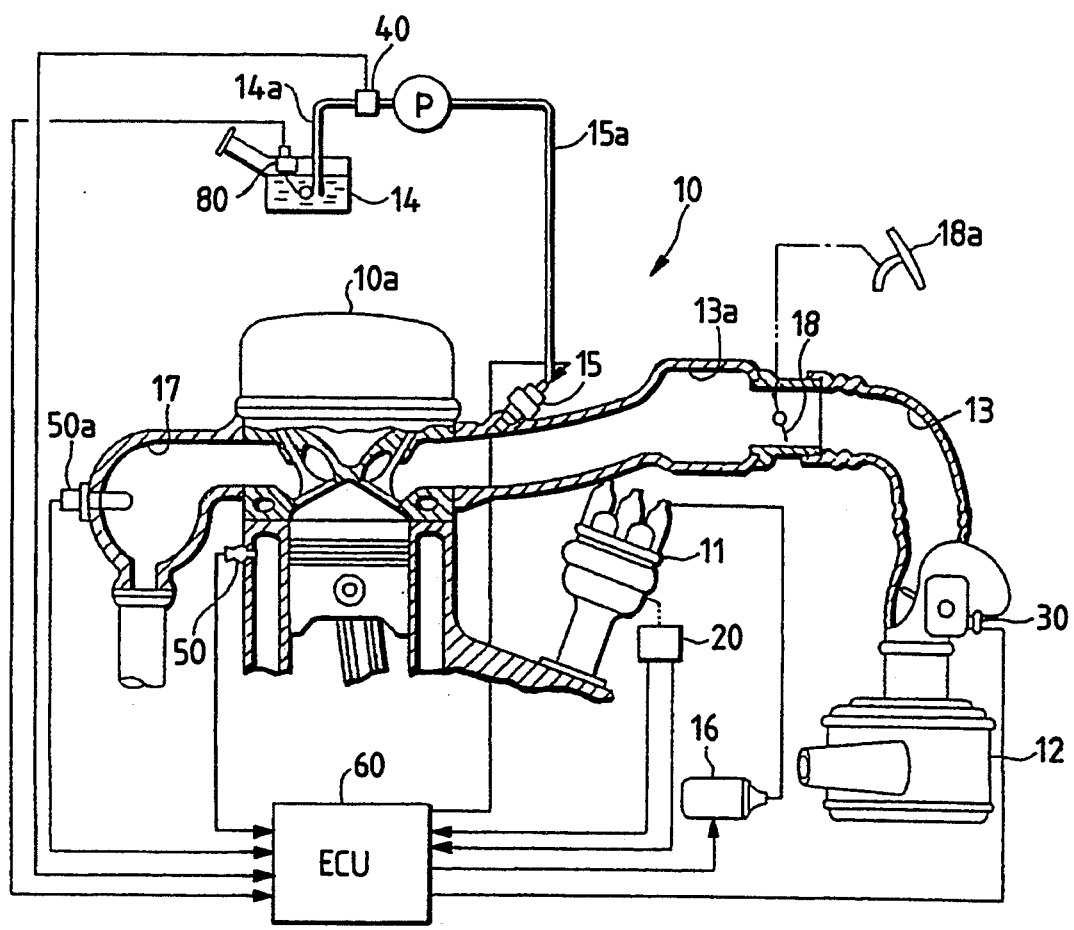
FIG. 29 is a diagram of an electronic control system according to a seventh embodiment of this invention.

FIG. 29 shows a seventh embodiment of this invention which is similar to the embodiment of FIGS. 1-6 and 11-19 except for design changes indicated hereinafter.

Figure 30:
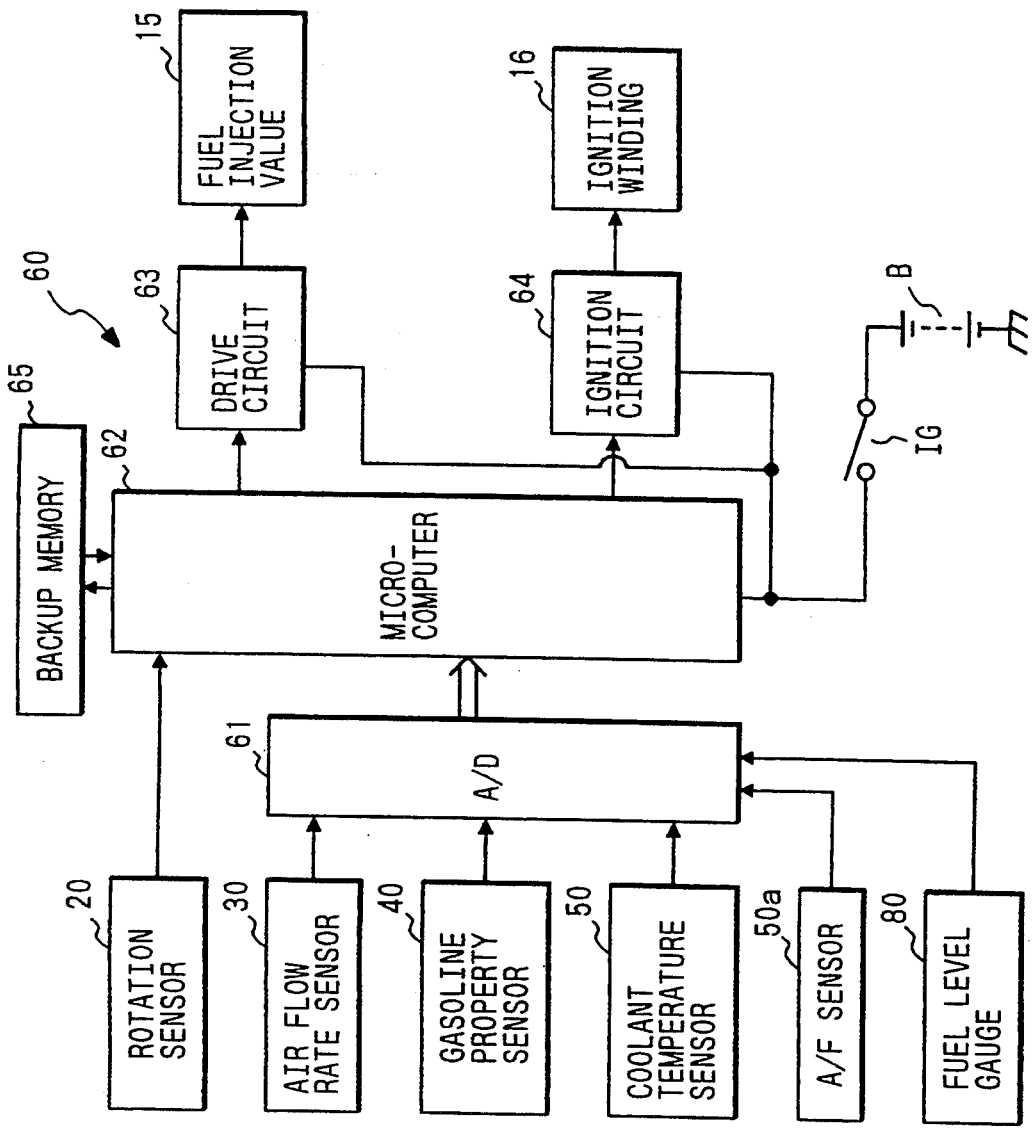
FIG. 30 is a block diagram of the electronic control system in the seventh embodiment.

The embodiment of FIG. 29 includes a fuel level gauge 80 disposed in the fuel tank 14. The fuel level gauge 80 detects the amount of fuel remaining in the fuel tank 14, and outputs an electric signal representing the detected mount of fuel remaining in the fuel tank 14. As shown in FIG. 30, the fuel level gauge 80 is electrically connected to an A/D converter 61 within an ECU 60 so that the output signal of the fuel level gauge 80 is fed thereto. The throttle sensor 50b (see FIG. 1) is omitted from the embodiment of FIG. 29.

As shown in FIG. 30, the ECU 60 of the seventh embodiment includes a backup memory 65 connected to a microcomputer 62. The backup memory 65 serves to hold data of a learned A/F ratio LRNo and a fuel remaining amount Qo when an engine ignition switch IG is in an OFF position. The learned A/F ratio LRNo is determined on the basis of a corrective coefficient FAF in A/F ratio feedback control. The fuel remaining amount Qo is detected by the fuel level gauge 80.

The standard-gasoline control step 75A and the wrong-operation preventing block 79B of FIG. 3 are omitted from the seventh embodiment, and a new wrong-operation preventing block is added to the seventh embodiment therefor. The new wrong-operation preventing block is effective in the case of fuel additionally containing alcohol.

Figure 33:
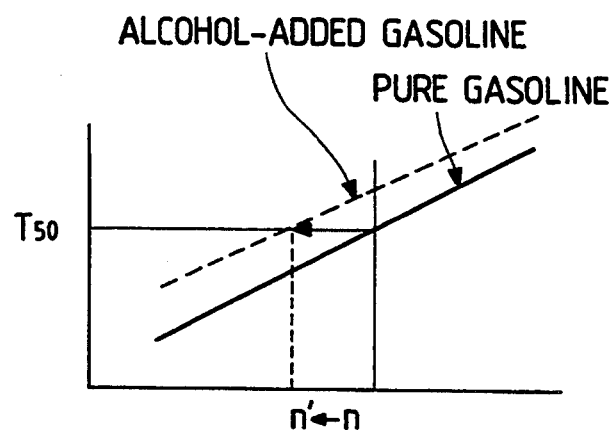
FIG. 33 is a graph of the relation between a refractive index "n" and a 50%-distillation temperature T50 of pure gasoline, and the relation between a refractive index "n" and a 50%-distillation temperature T50 of alcohol-added gasoline.

In FIG. 33, the solid line denotes the relation between the refractive index "n" and the 50%-distillation temperature T50 of pure gasoline, while the broken line denotes the relation between the refractive index "n" and the 50%-distillation temperature T50 of alcohol-added gasoline. As shown in FIG. 33, the relation between the refractive index "n" and the 50%-distillation temperature T50 of alcohol-added gasoline is shifted from the corresponding relation of pure gasoline. Thus, if the 50%-distillation temperature T50 (the degree of poorness of vaporization characteristics) is estimated from only the refractive index "n", wrong estimation tends to occur in the case of alcohol-added gasoline.

The A/F ratio feedback control includes an O₂ sensor 50a which detects the A/F ratio of an air-fuel mixture drawn into an engine 10. According the A/F ratio feedback control, the fuel injection rate is increased and decreased by adjusting the corrective coefficient FAF when the air-fuel mixture is detected to be lean and rich relative to the stoichiometric value respectively. As a result of the A/F ratio feedback control, the A/F ratio is maintained at essentially the stoichiometric value.

The A/F ratio corrective value FAF is learned under steady operating conditions of the engine 10. Data representing the learned corrective value (referred to as the learned value hereinafter) is stored into the backup memory 65 within the ECU 60. The learned value denotes how the basic fuel injection rate deviates from the target fuel injection rate. In addition, the learned value depends on the type of fuel. For example, in the case of alcohol-added gasoline, the resultant air-fuel mixture tends to be lean relative to an air-fuel mixture formed by pure gasoline and thus the learned value is increased to raise the fuel injection rate.

In the case where the learned value significantly changes as a result of fuel feed into the fuel tank 14, it is good to judge that the fuel fed into the fuel tank 14 differs in type from the previous fuel. The occurrence of fuel feed into the fuel tank 14 is detected by referring to the output signal of the fuel level gauge 80. Specifically, by referring to the output signal of the fuel level gauge 80, detection is given of the fuel remaining amount which occurs immediately before a change of the ignition switch IG from an ON position to an OFF position. In addition, detection is given of the fuel remaining amount which occurs immediately after a subsequent change of the ignition switch IG from the OFF position to the ON position. The former and latter detected remaining fuel amounts are compared. When the latter detected fuel remaining amount is greater than the former detected fuel remaining mount by a predetermined amount or more, fuel feed into the fuel tank 14 is judged to be executed. To enable the comparison between the former and latter detected remaining fuel amounts, information or data representing the former remaining fuel amount is stored in the backup memory 65.

Figure 31:
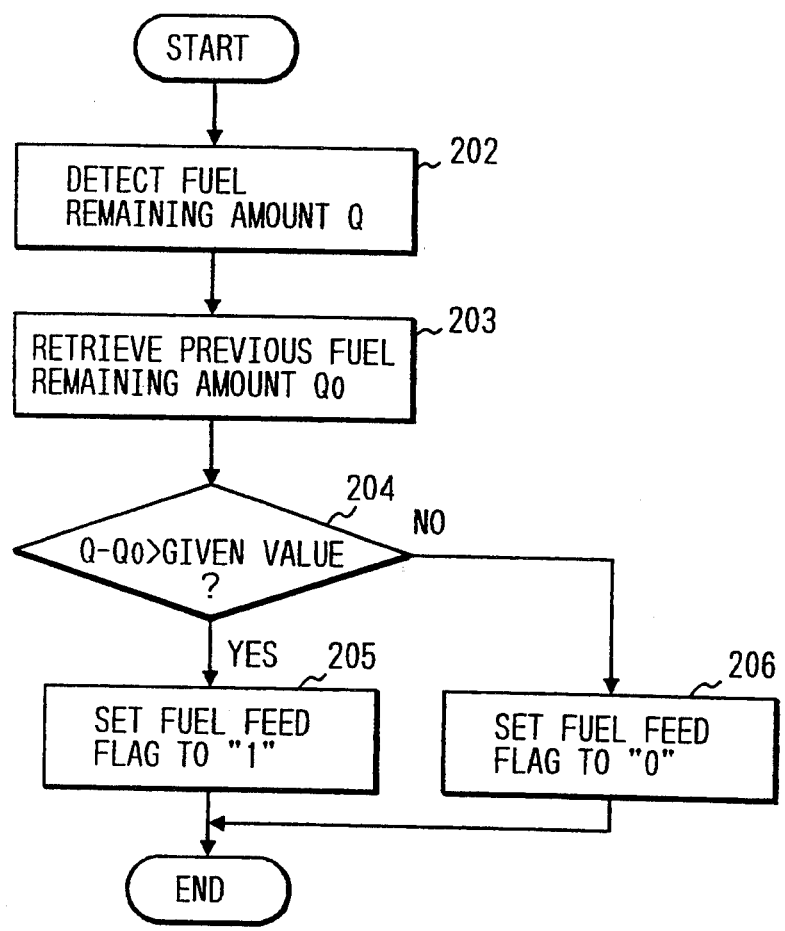
FIG. 31 is a flowchart of a main part of a program for controlling a microcomputer in the seventh embodiment.

The microcomputer 62 within the ECU 60 operates in accordance with a program stored in the internal ROM. A flowchart of a segment of the program is illustrated in FIG. 31. When the ignition switch IG is closed to start the engine 10, the program segment of FIG. 31 is also started. The program segment of FIG. 31 is executed once each time the ignition switch IG is closed.

As shown in FIG. 31, a first step 202 of the program segment derives the current fuel remaining amount Q from the output signal of the fuel level gauge 80. A step 203 following the step 202 fetches data from the backup memory 65, the data representing the fuel remaining amount Qo which occurs immediately before the last change of the ignition switch IG from the ON position to the OFF position. A step 204 following the step 203 calculates the difference between the current fuel remaining amount Q and the previous fuel remaining amount Qo. Then, the step 204 compares the calculated difference (Q-Qo) with a predetermined amount equal to, for example, 10 liters. When the calculated difference (Q-Qo) is greater than the predetermined amount, fuel feed into the fuel tank 14 is judged to be executed and the program advances from the step 204 to a step 205 which sets a fuel-feed indicating flag to "1". Otherwise, fuel feed into the fuel tank 14 is judged to be unexecuted and the program advances from the step 204 to a step 206 which sets the fuel-feed indicating flag to "0". After the steps 205 and 206, the program segment of FIG. 31 ends.

Figure 32:
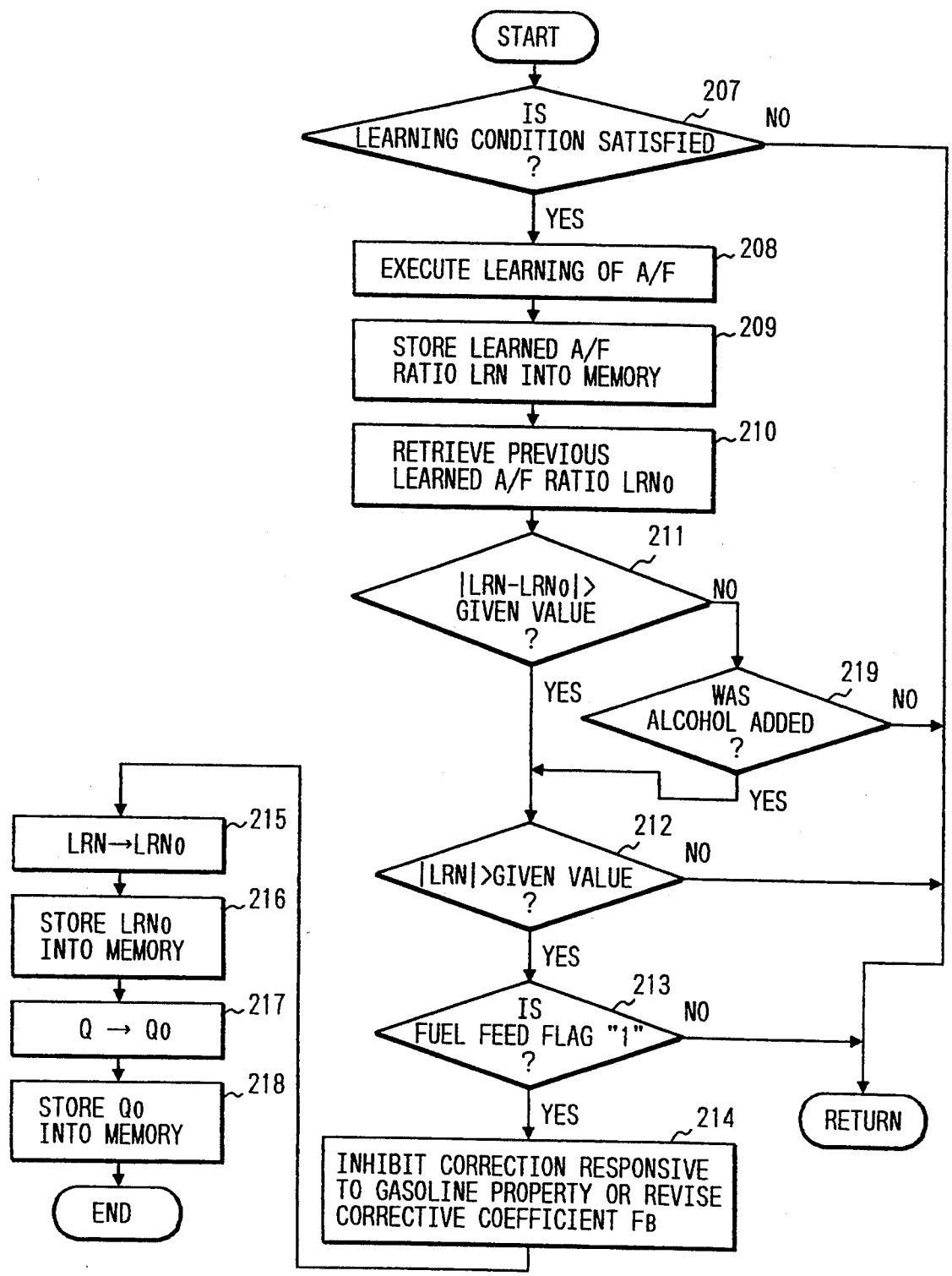
FIG. 32 is a flowchart of a wrong-operation preventing segment of the program for controlling the microcomputer in the seventh embodiment.

The program for operation of the microcomputer 62 includes a main routine having a segment, the flowchart of which is shown in FIG. 32. The program segment of FIG. 32 is reiterated at a predetermined period.

As shown in FIG. 32, a first step 207 of the program segment judges whether or not given A/F ratio learning conditions are satisfied. When the given A/F ratio learning conditions are judged to be satisfied, the program advances from the step 207 to a step 208. Otherwise, the program returns from the step 207 to the main routine.

The step 208 executes a predetermined process of learning the A/F ratio by referring to the corrective coefficient FAF used in the A/F ratio feedback control. A step 209 following the step 208 stores data into the backup memory 65, the data representing the learned A/F ratio LRN determined by the step 208.

A step 210 subsequent to the step 209 fetches data from the backup memory 65, the data representing the learned A/F ratio LRNo which occurs before the last change of the ignition switch IG from the ON position to the OFF position.

A step 211 following the step 210 calculates the absolute value of the difference between the current learned A/F ratio LRN and the previous learned A/F ratio LRNo. Then, the step 211 compares the calculated difference with a predetermined value equal to, for example, 10%. When the calculated difference is greater than the predetermined value, the program advances from the step 211 to a step 212. Otherwise, the program advances from the step 211 to a step 219.

The step 212 compares the absolute value of the current learned A/F ratio LRN with a predetermined value equal to, for example, 10%. When the absolute value of the current learned A/F ratio LRN is greater than the predetermined value, that is, when the A/F ratio is different from the stoichiometric value, the program advances from the step 212 to a step 213. Otherwise, the program returns from the step 212 to the main routine.

The step 213 judges whether or not the fuel-feed indicating flag is "1". When the fuel-feed indicating flag is judged to be "1", the program advances from the step 213 to a step 214. Otherwise, the program returns from the step 213 to the main routine. In the case where the program successively passes through the steps 211, 212, 213, and 214, it is judged that alcohol-added fuel is fed to the fuel tank 14 instead of pure gasoline by the fuel feed.

The step 214 inhibits the correction responsive to the output signal of the gasoline property sensor 40 until pure gasoline is fed to the fuel tank 14 again. Alternatively, the step 214 may revise or modify the corrective coefficient FB.

A step 215 following the step 214 sets the value LRNo equal to the value LRN, and thereby updates the learned A/F ratio LRNo. A step 216 subsequent to the step 215 stores data of the learned A/F ratio LRNo into the backup memory 65.

A step 217 following the step 2 16 sets the value Qo equal to the value Q, and thereby updates the fuel remaining amount Qo. A step 218 subsequent to the step 217 stores data of the fuel remaining amount Qo into the backup memory 65. After the step 218, the program segment of FIG. 32 ends.

As previously described, when the difference between the current learned A/F ratio LRN and the previous learned A/F ratio LRNo is judged to be not greater than the predetermined value at the step 211, the program advances from the step 211 to the step 219. The step 2 19 judges whether or not alcohol-added gasoline is previously used. When alcohol-added gasoline is judged to be previously used, the program advances from the step 219 to the step 212. Otherwise, the program returns from the step 219 to the main routine.

Figure 34:
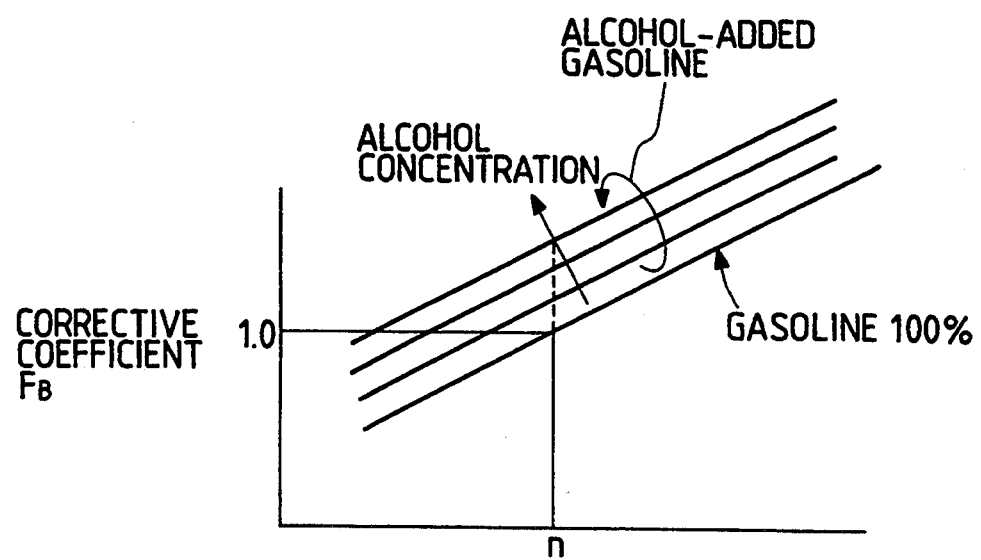
FIG. 34 is a graph of the relation between a corrective coefficient FB and a refractive index "n" of gasoline, the relation depending on an alcohol concentration in gasoline.

In the case where the step 214 modifies the corrective coefficient FB, the alcohol addition percentage or rate (the alcohol concentration) is estimated from the learned A/F ratio LRN and the corrective coefficient FB is modified according to the estimated alcohol addition rate as shown in FIG. 34.

What is claimed is:

1. An electronic control system for an internal combustion engine which is supplied with gasoline from a fuel supply source, said system comprising:
   gasoline-property detecting means for detecting a property of said gasoline;
   operating-condition detecting means for detecting an operating condition of said engine;
   control-amount determining means for determining a gasoline-property-responsive control amount of said engine in accordance with said gasoline property detected by said gasoline-property detecting means and said engine operating condition detected by said operating-condition detecting means, said control-amount determining means including:
      fuel injection rate determining means for determining a rate of fuel injection into said engine in accordance with said gasoline property detected by said gasoline-property detecting means;
   control means for controlling said engine in accordance with said gasoline-property-responsive control amount determined by said control-amount determining means; and
   improper-operation preventing means for detecting an improper controlled state of said engine, and for suppressing a gasoline-property-responsive control, which is controlled via said control-amount determining means, when said improper controlled state of said engine is detected, said improper-operation preventing means including:
   first suppressing means for suppressing said gasoline-property-responsive control when:
      said fuel rate injection determining means determines said fuel injection rate is enriching an air-fuel mixture supplied to said engine; and
      said air-fuel mixture becomes richer than a predetermined air-fuel ratio.

2. An electric control system for an internal combustion engine which is supplied with gasoline from a fuel supply source, said system comprising:
   gasoline-property detecting means for detecting a property of said gasoline;
   operating-condition detecting means for detecting an operating condition of said engine;

control-amount determining means for determining a gasoline-property-responsive control amount of said engine in accordance with said gasoline property detected by said gasoline-property detecting means and said engine operating condition detected by said operating-condition detecting means, said control-amount determining means including:

fuel injection rate determining means for determining a rate of fuel injection into said engine in accordance with said gasoline property detected by said gasoline-property detecting means;

control means for controlling said engine in accordance with said gasoline-property-responsive control amount determined by said control-amount determining means; and improper-operation preventing means for detecting an improper controlled state of said engine, and for suppressing said gasoline-property-responsive control, which is controlled via said control-amount determining means, when said improper controlled state of said engine is detected, said improper-operation preventing means including:

suppressing means for suppressing said gasoline-property-responsive control when:

said fuel rate injection determining means determines said fuel injection rate is making an air-fuel mixture supplied to said engine leaner; and said air-fuel mixture becomes leaner than a predetermined air-fuel ratio.

3. An electric control system according to claim 1, wherein said improper-operation preventing means further comprises second suppressing means for suppressing said gasoline-property-responsive control when:

said fuel rate injection determining means determines said fuel injection rate is making an air-fuel mixture supplied to said engine leaner; and said air-fuel mixture becomes leaner than a predetermined air-fuel ratio.

4. An electric control system according to claim 1, further comprising an air-fuel ratio sensor for detecting an air-fuel ratio of said air-fuel mixture, and wherein said improper-operation preventing means further comprises:

period-ratio judging means for calculating, based upon said air-fuel ratio detected by said air-fuel ratio sensor, a ratio between a period where said air-fuel mixture is richer than a stoichiometric value and a period where said air-fuel mixture is leaner than said stoichiometric value, and for judging whether said calculated ratio is smaller than a predetermined ratio;

control-direction judging means for judging whether said air-fuel ratio is controlled by said control-amount determining means at a rich side or a lean side with respect to said stoichiometric value based on said gasoline property detected by said gasoline-property detecting means; and second suppressing means for suppressing said gasoline-property-responsive control when at least one of:

said period-ratio judging means calculates said rich side period to be equal to or greater than a predetermined value and said control-direction judging means calculates that said air-fuel ratio is being controlled at said rich side; and said period-ratio judging means calculates said lean side period to be equal to or greater than a predetermined value and said control-direction judging means calculates that said air-fuel ratio is being controlled at said lean side.

5. An electric control system according to claim 1, further comprising:

an air-fuel ratio sensor for detecting an air-fuel ratio of said air-fuel mixture; and air-fuel ratio feedback means for calculating a feedback corrective value for controlling an air-fuel ratio at a stoichiometric value in response to said air-fuel ratio detected by said air-fuel ratio sensor; and wherein said improper-operation preventing means further comprises;

corrective-value judging means for determining whether said feedback corrective value calculated by said air fuel ratio feedback means is richer than said stoichiometric value by at least a predetermined value;

control-direction judging means for determining whether said air-fuel ratio is controlled via said control amount detecting means at a rich side or a lean side with respect to said stoichiometric value based on said gasoline property detected by said gasoline-property detecting means; and second suppressing means for suppressing said gasoline-property-responsive control when said corrective-value judging means determines that said feedback corrective value is richer than said stoichiometric value by at least said predetermined value and said control-direction judging means determines that said air-fuel ratio is being controlled at said rich side.

6. An electric control system according to claim 2, further comprising:

an air-fuel ratio sensor for detecting an air-fuel ratio of said air-fuel mixture; and air-fuel ratio feedback means for calculating a feedback corrective value for controlling an air-fuel ratio at a stoichiometric value in response to said air-fuel ratio detected by said air-fuel ratio sensor; and wherein said improper-operation preventing means further comprises:

corrective-value judging means for determining whether said feedback corrective value calculated by said air fuel ratio feedback means is leaner than said stoichiometric value by at least a predetermined value;

control-direction judging means for determining whether said air-fuel ratio is controlled via said control-amount determining means at a rich side or a lean side with respect to said stoichiometric value based on said gasoline property detected by said gasoline-property detecting means; and second suppressing means for suppressing said gasoline-property-responsive control when said corrective-value judging means determines that said feedback corrective value is leaner than said stoichiometric value by at least said predetermined value and said control-direction judging means determines that said air-fuel ratio is being controlled at said lean side.

7. An electric control system according to claim 3, further comprising:

an air-fuel ratio sensor for detecting an air-fuel ratio of said air-fuel mixture; and air-fuel ratio feedback means for calculating a feedback corrective value for controlling an air-fuel ratio at a stoichiometric value in response to said air-fuel ratio detected by said air-fuel ratio sensor; and wherein said improper-operation preventing means further comprises:

first corrective-value judging means for determining whether said feedback corrective value calculated by said air-fuel ratio feedback means is richer than said stoichiometric value by at least a first predetermined value;

second corrective-value judging means for determining whether said feedback corrective value calculated by said air-fuel ratio feedback means is leaner than said stoichiometric value by at least a second predetermined value;

control direction judging means for determining whether said air-fuel ratio is controlled by said control-amount determining means at a rich side or a lean side with respect to said stoichiometric value based on said gasoline property detected by said gasoline-property detecting means; and third suppressing means for suppressing said gasoline-property-responsive control:

when said first corrective-value judging means determines that said feedback corrective value is richer than said stoichiometric value by least said first predetermined value and said control-direction at judging means determines that said air-fuel ratio is being controlled at said rich side; and when said second corrective value judging means determines that said feedback corrective value is leaner than said stoichiometric value by at least said second predetermined value and said control-direction judging means determines that said air-fuel ratio is being controlled at said lean side.

8. An electric control system according to claim 1, further comprising idle speed control means for controlling an idle rotational speed of said engine at a target speed, and wherein said improper-operation preventing means further comprises:

idle speed variation detecting means for determining whether a variation in said idle rotational speed is greater than a predetermined value; and second suppressing means for suppressing said gasoline-property-responsive control when said idle speed variation detecting means determines that said variation in said idle rotational speed is greater than said predetermined value.

9. An electric control system according to claim 1, further comprising idle speed control means for controlling an idle rotational speed of said engine at a target speed, and wherein said improper-operation preventing means further comprises:

idle speed judging means for determining whether said idle rotational speed is lower than said target speed by at least a predetermined value; and second suppressing means for suppressing said gasoline-property-responsive control when said idle speed judging means determines that said idle rotational speed is lower than said target speed by at least said predetermined value.

10. An electric control system according to claim 1, further comprising idle speed control means for controlling an idle rotational speed of said engine at a target speed, and wherein said improper-operation preventing means further comprises:

idle speed variation detecting means for determining whether a variation in said idle rotational speed is greater than a first predetermined value;

idle speed judging means for determining whether said idle rotational speed is lower than said target speed by at least a second predetermined value; and second suppressing means for suppressing said gasoline-property-responsive control when at least one of said idle speed variation detecting means determines that said variation in said idle rotational speed is greater than said first predetermined value and said idle speed judging means determines that said idle rotational speed is lower than said target speed by at least said second predetermined value.

11. An electric control system according to claim 1, further comprising:

additive fuel detecting means for detecting that said gasoline contains an additive fuel; and second suppressing means for suppressing said gasoline-property-responsive control when said additive fuel detecting means detects that said gasoline contains said additive fuel.

12. An electric control system according to claim 11, further comprising;

an air-fuel ratio sensor for detecting an air-fuel ratio of said air-fuel mixture:

air-fuel ratio feedback means for calculating a feedback corrective value for controlling said air-fuel ratio at a stoichiometric value in response to said air-fuel ratio detected by said air-fuel ratio sensor;

an ignition switch having an ON position and an OFF position; and learned air-fuel ratio memorizing means for holding a learned air-fuel ratio based on said feedback corrective value calculated by said air-fuel ratio feedback means after said ignition switch is moved to said OFF position; and wherein said additive fuel detecting means includes:

previous learned air-fuel ratio retrieving means for retrieving said learned air-fuel ratio from said learned air-fuel ratio memorizing means when said ignition switch is moved from said ON position to said off position;

fuel feed detecting means for detecting a fuel feed; and judging means for determining whether said gasoline contains said additive fuel when a difference between said previous learned air-fuel ratio, which is retrieved by said previous learned air-fuel ratio retrieving means, and said learned air-fuel ratio value, which occurs after said fuel feed has occurred, is equal to or greater than a predetermined value.

13. An electric control system of claim 12, wherein:

said fuel supply source comprises a fuel tank, and a fuel level gauge for detecting an amount of fuel remaining in said fuel tank; and said fuel feed detecting means comprises:

fuel remaining memorizing means for holding said amount of fuel remaining in said fuel tank, which is detected by said fuel level gauge, when said ignition switch is moved to said OFF position; and judging means for determining an amount of fuel fed to said fuel tank when said amount of fuel remaining in said fuel tank, which is detected by said fuel level gauge when said ignition switch is moved to said ON position, is greater than said amount of fuel remaining in said fuel tank, which is held by said fuel remaining amount memorizing means, by at least a predetermined amount.

14. An electric control system according to claim 1, wherein said improper-operation preventing means further comprises means for decreasing said gasoline-property-responsive control amount determined by said control-amount determining means, thereby suppressing said gasoline-property-responsive control.

15. An electric control system according to claim 1, wherein said improper-operation preventing means further comprises means for inhibiting said gasoline-property-responsive control, thereby suppressing said gasoline-property-responsive control amount, which is determined by said control-amount determining means.

16. An electric control system according to claim 1, further comprising engine temperature detecting means for detecting a temperature of said engine, and wherein said control-amount determining means comprises temperature responsive control amount determining means for determining said gasoline-property-responsive control amount in accordance with said temperature of said engine as detected by said engine temperature detecting means.

17. An electric control system according to claim 1, wherein said gasoline property detecting means comprises a sensor for detecting a refractive index of said gasoline so as to determine a vaporization characteristics of said gasoline.

18. An apparatus for controlling an engine that includes means for mixing air and fuel into an air-fuel mixture, and means for burning said air-fuel mixture, the apparatus comprising:

means for detecting a property of said fuel;

means for controlling an operating condition of said engine in accordance with said property of said fuel, which is detected by said detecting means;

means for determining whether said controlling of said operating condition of said engine by said controlling means is improper; and means for suppressing said controlling of said operating condition of said engine by said controlling means when said determining means determines that said controlling of said operating condition of said engine by said controlling means is improper.

19. An apparatus for controlling an engine that includes means for mixing air and fuel into an air-fuel mixture, and means for burning said air-fuel mixture, said apparatus comprising:

means for detecting a vaporization characteristics of said fuel;

means for controlling an operating condition of said engine in accordance with said vaporization characteristics of said fuel, which is detected by said detecting means;

means for determining whether said controlling of said operating condition of said engine by said controlling means is improper; and means for suppressing said controlling of said operating condition of said engine by said controlling means when said determining means determines said controlling of said operating condition of said engine by said controlling means is improper.

* * * * *